United States Patent
Hahm et al.

(10) Patent No.: US 7,894,404 B2
(45) Date of Patent: *Feb. 22, 2011

(54) GENERATION OF QUALITY METRICS USING MULTIBRANCH PSYNC DETECTION MODULE

(75) Inventors: Mark David Hahm, Hartland, WI (US); Wei Luo, Marlbor, NJ (US); Hendrik Johannes Conroy, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 777 days.

This patent is subject to a terminal disclaimer.

(21) Appl. No.: 11/844,066

(22) Filed: Aug. 23, 2007

(65) Prior Publication Data

US 2009/0034490 A1 Feb. 5, 2009

Related U.S. Application Data

(60) Provisional application No. 60/953,280, filed on Aug. 1, 2007.

(51) Int. Cl.
*H04B 7/216* (2006.01)
*H04J 3/06* (2006.01)

(52) U.S. Cl. .................. 370/335; 370/342; 370/350; 370/516

(58) Field of Classification Search .......... 370/335, 370/342, 350, 516
See application file for complete search history.

(56) References Cited

U.S. PATENT DOCUMENTS

| | | | |
|---|---|---|---|
| 6,597,729 B1 * | 7/2003 | Schmidl et al. ............. | 375/149 |
| 6,704,374 B1 | 3/2004 | Belotserkovsky et al. | |
| 6,801,567 B1 * | 10/2004 | Schmidl et al. ............. | 375/149 |
| 6,834,048 B1 * | 12/2004 | Cho et al. ................... | 370/356 |
| 2002/0054624 A1 * | 5/2002 | Boloorian ................... | 375/150 |
| 2003/0108135 A1 * | 6/2003 | Frigon ........................ | 375/354 |
| 2003/0142733 A1 * | 7/2003 | Boloorian ................... | 375/148 |
| 2004/0259576 A1 * | 12/2004 | Jonsson et al. ............. | 455/464 |
| 2006/0014500 A1 * | 1/2006 | Marsili ..................... | 455/115.1 |
| 2007/0025428 A1 * | 2/2007 | Hahm et al. ................ | 375/149 |
| 2007/0202928 A1 * | 8/2007 | Landau et al. ............. | 455/567 |
| 2008/0063046 A1 * | 3/2008 | Conroy et al. ............... | 375/239 |
| 2010/0080192 A1 * | 4/2010 | Dong et al. ................. | 370/332 |

FOREIGN PATENT DOCUMENTS

KR 20010082164 A 8/2001

* cited by examiner

*Primary Examiner*—Andrew Lee
(74) *Attorney, Agent, or Firm*—Garlick Harrison & Markison; Bruce E. Garlick

(57) ABSTRACT

A wireless terminal is operable to receive a Wideband Code Division Multiple Access (WCDMA) signal from a base station and includes clock circuitry, a wireless interface, and a Primary Synchronization (PSYNC) module. The clock circuitry generates a wireless terminal clock using a wireless terminal oscillator. The wireless interface receives the WCDMA signal, which is produced by the base station using a base station clock that is produced using a base station oscillator that is more accurate than the wireless terminal oscillator. The PSYNC module includes a plurality of PSYNC correlation branches. Each PSYNC correlation branch phase rotates the WCDMA signal based upon a respective frequency offset, correlates the phase rotated WCDMA signal with a Primary Synchronization Channel (PSCH) code over a plurality of sampling positions, and produces PSYNC correlation energies based upon the correlations for each of the plurality of sampling positions.

22 Claims, 29 Drawing Sheets

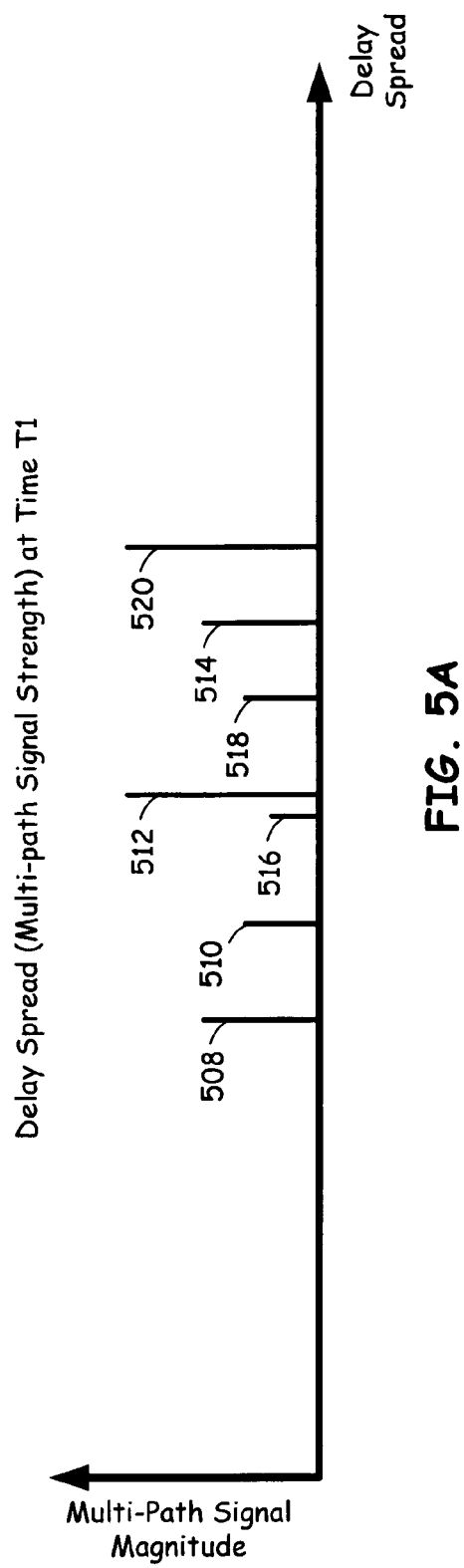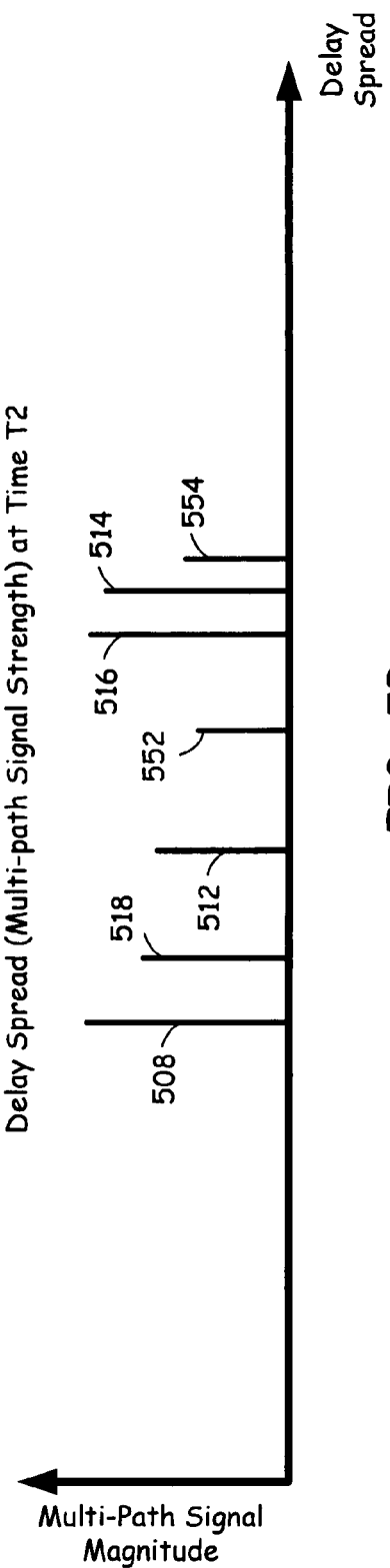

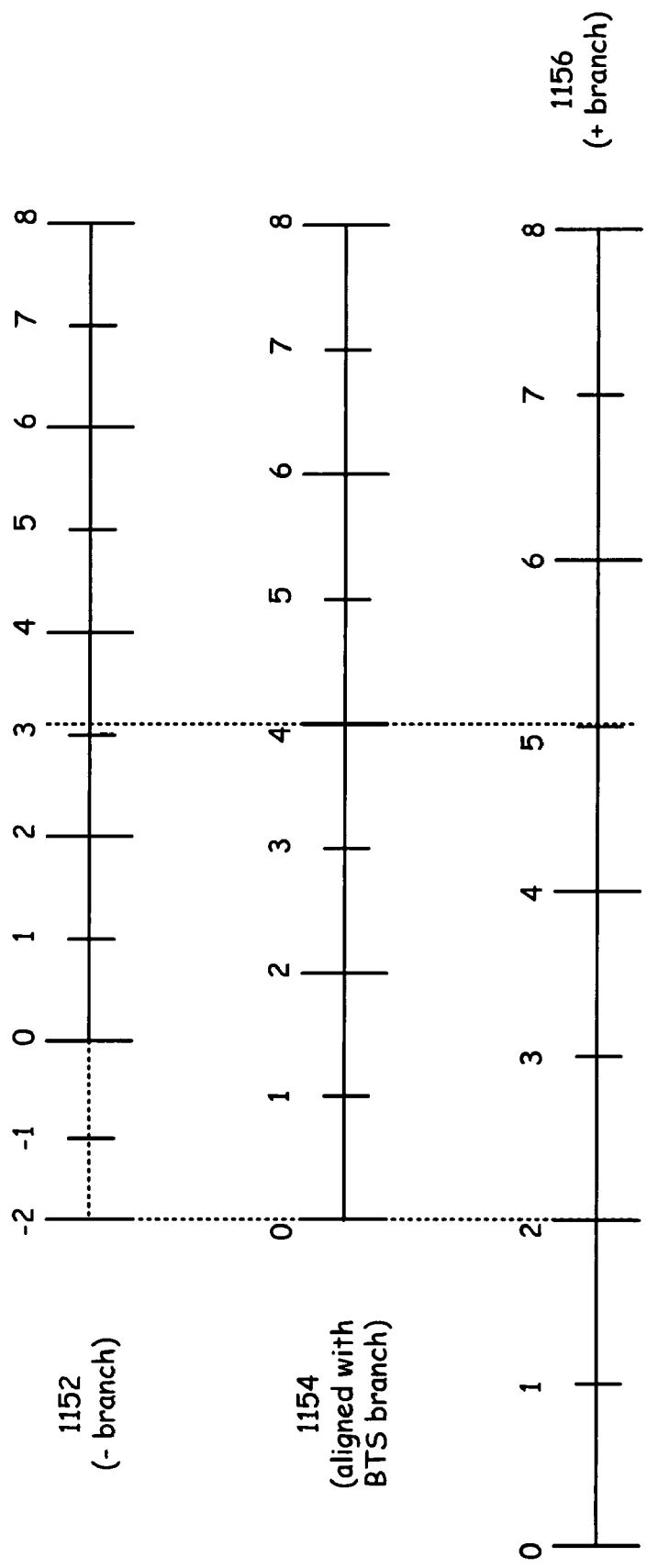

GENERATION OF QUALITY METRICS USING MULTIBRANCH PSYNC DETECTION MODULE

CROSS REFERENCE TO RELATED APPLICATION

The present application claims priority to U.S. Provisional Application No. 60/953,280 filed Aug. 1, 2007, which is incorporated herein by reference in its entirety for all purposes.

BACKGROUND

1. Technical Field

The present invention relates generally to wireless communication systems; and more particularly to the synchronization of a wireless terminal to a serving wireless communication system infrastructure.

2. Related Art

Mobile communication has changed the way people communicate and mobile phones have been transformed from a luxury item to an essential part of every day life. The use of mobile phones today is generally dictated by social situations, rather than being hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

The General Packet Radio Service (GPRS) and Enhanced Data rates for GSM (EDGE) technologies may be utilized for enhancing the data throughput of present second generation (2G) systems such as GSM. The GSM technology may support data rates of up to 14.4 kilobits per second (Kbps), while the GPRS technology may support data rates of up to 115 Kbps by allowing up to 8 data time slots per time division multiple access (TDMA) frame. The GSM technology, by contrast, may allow one data time slot per TDMA frame. The EDGE technology may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The UMTS technology with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. The High Speed Downlink Packet Access (HSDPA) technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology may also utilize variable coding rates. The HSDPA technology supports 16-level Quadrature Amplitude Modulation (16-QAM) over a high-speed downlink shared channel (HS-DSCH), which permits a plurality of users to share an air interface channel In some instances, HSDPA may provide a two-fold improvement in network capacity as well as data speeds up to five times (over 10 Mbit/s) higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA is an extension of the GSM family, it also builds directly on the economies of scale offered by the world's most popular mobile technology. HSDPA may offer breakthrough advances in WCDMA network packet data capacity, enhanced spectral and radio access networks (RAN) hardware efficiencies, and streamlined network implementations. Those improvements may directly translate into lower cost-per-bit, faster and more available services, and a network that is positioned to compete more effectively in the data-centric markets of the future.

The capacity, quality, and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and will drive the consumption of data-heavy services while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 kbit/s to 1.8 Mbit/s with QPSK modulation and 3.6 Mbit/s and up with 16-QAM modulation. The highest capability class supports the maximum theoretical bit rate of 14.4 Mbit/s.

However, implementing advanced wireless technologies such as WCDMA and/or HSDPA may still require overcoming some architectural hurdles because of the very high-speed, wide bandwidth data transfers possible. For example, multiple-input multiple-output (MIMO) antenna architectures, and multipath processing receiver circuitry may be implemented to process the high speed, high bandwidth received RF signals to digital data. But, with the high speed, wide bandwidth access to, for example, the Internet, made possible by HSDPA, various protocol handlers at a mobile terminal may have problems in keeping up with the received packets.

With the increase in complexity and performance of the over the air interface between a wireless terminal and a servicing WCDMA base station, increased cost and complexity of the wireless terminal is a necessary result. It would be advantageous to reduce component costs of the wireless terminal. One relatively expensive component of the wireless terminal is its crystal oscillator, which it uses to generate a wireless terminal clock. The wireless terminal uses the wireless terminal clock to synchronize to, and be serviced by the WCDMA base station. In order to accomplish this result, the wireless terminal clock must closely match a WCDMA base station clock, which the WCDMA base station uses to service the over the air interface. However, the base station clock is generated by the WCDMA base station using a high cost/high accuracy crystal oscillator. Thus, while using a less costly wireless terminal crystal oscillator for the wireless terminal would noticeably reduce the cost of the wireless terminal, it would also create significant difficulties for the wireless terminal in being serviced by the WCDMA base station.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 5A is a graph illustrating an example of a multi-path delay spread at a first time;

FIG. 5B is a graph illustrating the example of the multi-path delay spread of FIG. 5B at a second time;

FIG. 11A is a timing diagram illustrating slippage of PSYNC correlation energies of respective positions across a plurality of PSYNC correlation branches;

DETAILED DESCRIPTION OF THE DRAWINGS

Figure 1:
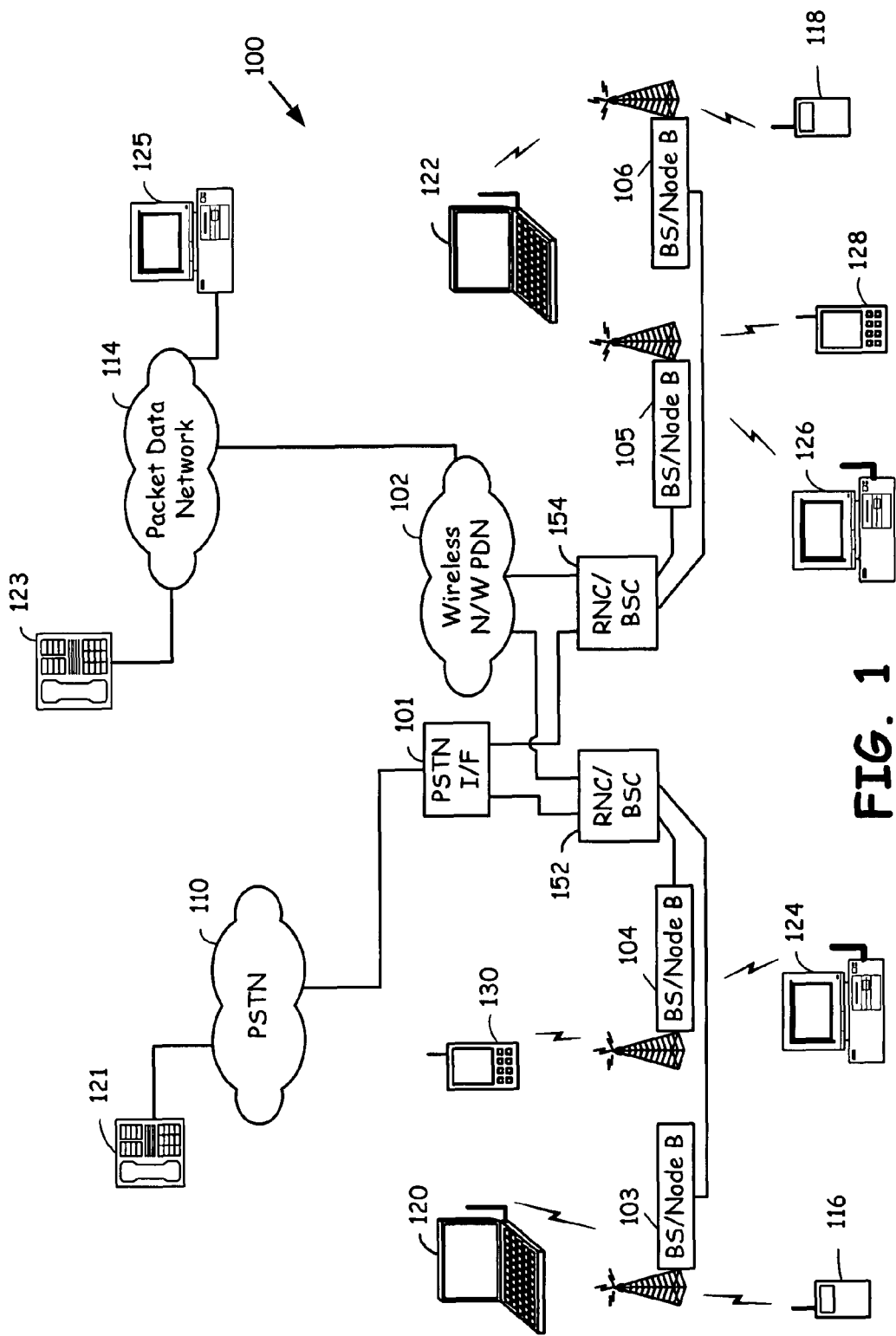
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Public Switched Telephone Network (PSTN) Interface 101, e.g., Mobile Switching Center, a wireless network packet data network 102 that includes GPRS Support Nodes, EDGE Support Nodes, WCDMA Support Nodes, and other components, Radio Network Controllers/Base Station Controllers (RNC/BSCs) 152 and 154, and base stations/node Bs 103, 104, 105, and 106. The wireless network packet data network 102 couples to additional private and public packet data networks 114, e.g., the Internet, WANs, LANs, etc. A conventional voice terminal 121 couples to the PSTN 110. A Voice over Internet Protocol (VoIP) terminal 123 and a personal computer 125 couple to the Internet/WAN 114. The PSTN Interface 101 couples to the PSTN 110. Of course, this particular structure may vary from system to system.

Each of the base stations/node Bs 103-106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports one or more of the UMTS/WCDMA standards, including the HSDPA and HSUPA standards, the Global System for Mobile telecommunications (GSM) standards, the GSM General Packet Radio Service (GPRS) extension to GSM, the Enhanced Data rates for GSM (or Global) Evolution (EDGE) standards, and/or various other CDMA standards, TDMA standards and/or FDMA standards, etc.

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the EDGE operating standard, the GPRS standard, the UMTS/WCDMA standards, and/or the GSM standards.

With the system 100 of FIG. 1, it is desirable to use relatively low cost crystal oscillators for wireless terminals 116-130. However, the low cost crystal oscillators of the wireless terminals 116-130 are not as accurate as the high cost crystal oscillators of the base stations/node Bs 103-106. A low cost crystal oscillator used by one of wireless terminals 116-130 may have a frequency offset of up to (or more than) 10 Parts-Per-Million (PPM) as compared to the higher quality crystal oscillators of the node Bs 103-106 but may also be a fraction of the cost of a higher quality crystal oscillator.

The potential (and likely) frequency offset between a base station clock generated using a higher quality crystal oscillator and a wireless terminal clock generated using a lower quality crystal oscillator is problematic when the wireless terminal 128 attempts to receive service from a base station, e.g., node B 105. As will be described in detail hereinafter, the wireless terminal 128 performs cell search operations when attempting to receive service from (attach to) the base station 105. Cell search operations require the wireless terminal 128 to correlate a broadcast signal received from the base station 105 with known channel patterns. These correlation operations allow the wireless terminal 128 to synchronize to the base station 105. When the wireless terminal clock is offset in frequency from the base station clock that is used to generate the broadcast signal, the correlation operations of the wireless terminal 128 will often fail, or at least be compromised so that the wireless terminal 128 may be unable to synchronize with the base station 105.

Thus, according to the present invention, wireless terminals 116-130 include a primary synchronization (PSYNC) module having a plurality of PSYNC correlation branches, each of which performs correlations assuming a respective frequency offset. The span of the plurality of frequency offsets of the plurality of PSYNC correlation branches is sufficient to cover most/all possible frequency offsets between the base station clock and the wireless terminal clock and allow the wireless terminal 128 to successfully synchronize to the base station 105. The structure and operation of the PSYNC modules of the wireless terminals 116-130 will be described further herein with reference to FIGS. 8-25.

The PSYNC correlation module of the present invention includes structure, e.g., multiple branches that may be used in other applications as well to enable one device to determine a frequency offset with another device. The principles of the present invention are described herein with reference to a WCDMA system. However, the principles of the present invention may be used in differing types of systems as well such as LTE systems, TD-SCDMA systems, and other types of systems.

Figure 2:
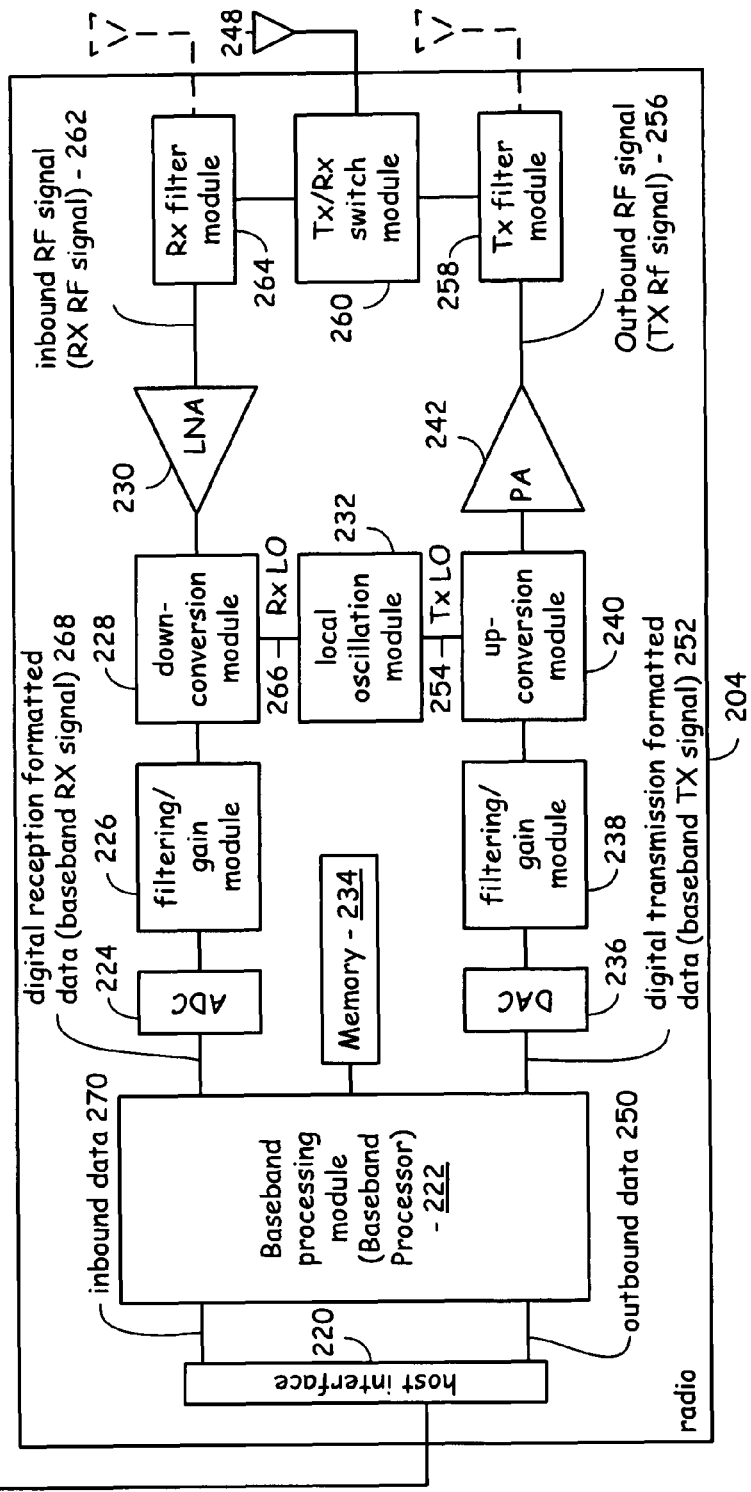
FIG. 2 is a block diagram functionally illustrating a wireless terminal constructed according to the present invention.

FIG. 2 is a schematic block diagram illustrating a wireless terminal that includes host processing components 202 and an associated radio 204. For cellular telephones, the host processing components and the radio 204 are contained within a single housing. In some cellular telephones, the host processing components 202 and some or all of the components of the radio 204 are formed on a single Integrated Circuit (IC). For personal digital assistants hosts, laptop hosts, and/or personal computer hosts, the radio 204 may reside within an expansion card and, therefore, reside be house separately from the host processing components 202. The host processing components 202 include at least a processing module 206, memory 208, radio interface 210, an input interface 212, and an output interface 214. The processing module 206 and memory 208 execute instructions to support host terminal functions. For example, for a cellular telephone host device, the processing module 206 performs user interface operations and executes host software programs among other operations.

The radio interface 210 allows data to be received from and sent to the radio 204. For data received from the radio 204 (e.g., inbound data), the radio interface 210 provides the data to the processing module 206 for further processing and/or routing to the output interface 214. The output interface 214 provides connectivity to an output display device such as a display, monitor, speakers, et cetera such that the received data may be displayed. The radio interface 210 also provides data from the processing module 206 to the radio 204. The processing module 206 may receive the outbound data from an input device such as a keyboard, keypad, microphone, et cetera via the input interface 212 or generate the data itself For data received via the input interface 212, the processing module 206 may perform a corresponding host function on the data and/or route it to the radio 204 via the radio interface 210.

Radio 204 includes a host interface 220, baseband processing module 222 (baseband processor) 222, analog-to-digital converter 224, filtering/gain module 226, down conversion module 228, low noise amplifier 230, local oscillation module 232, memory 234, digital-to-analog converter 236, filtering/gain module 238, up-conversion module 240, power amplifier 242, RX filter module 264, TX filter module 258, TX/RX switch module 260, and antenna 248. Antenna 248 may be a single antenna that is shared by transmit and receive paths (half-duplex) or may include separate antennas for the transmit path and receive path (full-duplex). The antenna implementation will depend on the particular standard to which the wireless communication device is compliant.

The baseband processing module 222 in combination with operational instructions stored in memory 234, execute digital receiver functions and digital transmitter functions. The digital receiver functions include, but are not limited to, digital intermediate frequency to baseband conversion, demodulation, constellation demapping, descrambling, and/or decoding. The digital transmitter functions include, but are not limited to, encoding, scrambling, constellation mapping, modulation, and/or digital baseband to IF conversion. The transmit and receive functions provided by the baseband processing module 222 may be implemented using shared processing devices and/or individual processing devices. Processing devices may include microprocessors, microcontrollers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. The memory 234 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 222 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 204 receives outbound data 250 from the host processing components via the host interface 220. The host interface 220 routes the outbound data 250 to the baseband processing module 222, which processes the outbound data 250 in accordance with a particular wireless communication standard (e.g., UMTS/WCDMA, GSM, GPRS, EDGE, et cetera) to produce digital transmission formatted data 252. The digital transmission formatted data 252 is a digital base-band signal or a digital low IF signal, where the low IF will be in the frequency range of zero to a few kilohertz/megahertz.

The digital-to-analog converter 236 converts the digital transmission formatted data 252 from the digital domain to the analog domain. The filtering/gain module 238 filters and/or adjusts the gain of the analog signal prior to providing it to the up-conversion module 240. The up-conversion module 240 directly converts the analog baseband or low IF signal into an RF signal based on a transmitter local oscillation 254 provided by local oscillation module 232. The power amplifier 242 amplifies the RF signal to produce outbound RF signal 256, which is filtered by the TX filter module 258. The TX/RX switch module 260 receives the amplified and filtered RF signal from the TX filter module 258 and provides the output RF signal 256 signal to the antenna 248, which transmits the outbound RF signal 256 to a targeted device such as a base station 103-106.

The radio 204 also receives an inbound RF signal 262, which was transmitted by a base station via the antenna 248, the TX/RX switch module 260, and the RX filter module 264. The low noise amplifier 230 receives inbound RF signal 262 and amplifies the inbound RF signal 262 to produce an amplified inbound RF signal. The low noise amplifier 230 provides the amplified inbound RF signal to the down conversion module 228, which converts the amplified inbound RF signal into an inbound low IF signal or baseband signal based on a receiver local oscillation 266 provided by local oscillation module 232. The down conversion module 228 provides the inbound low IF signal (or baseband signal) to the filtering/gain module 226, which filters and/or adjusts the gain of the signal before providing it to the analog to digital converter 224. The analog-to-digital converter 224 converts the filtered inbound low IF signal (or baseband signal) from the analog domain to the digital domain to produce digital reception formatted data 268. The baseband processing module 222 demodulates, demaps, descrambles, and/or decodes the digital reception formatted data 268 to recapture inbound data 270 in accordance with the particular wireless communication standard being implemented by radio 204. The host interface 220 provides the recaptured inbound data 270 to the host processing components 202 via the radio interface 210.

Figure 3:
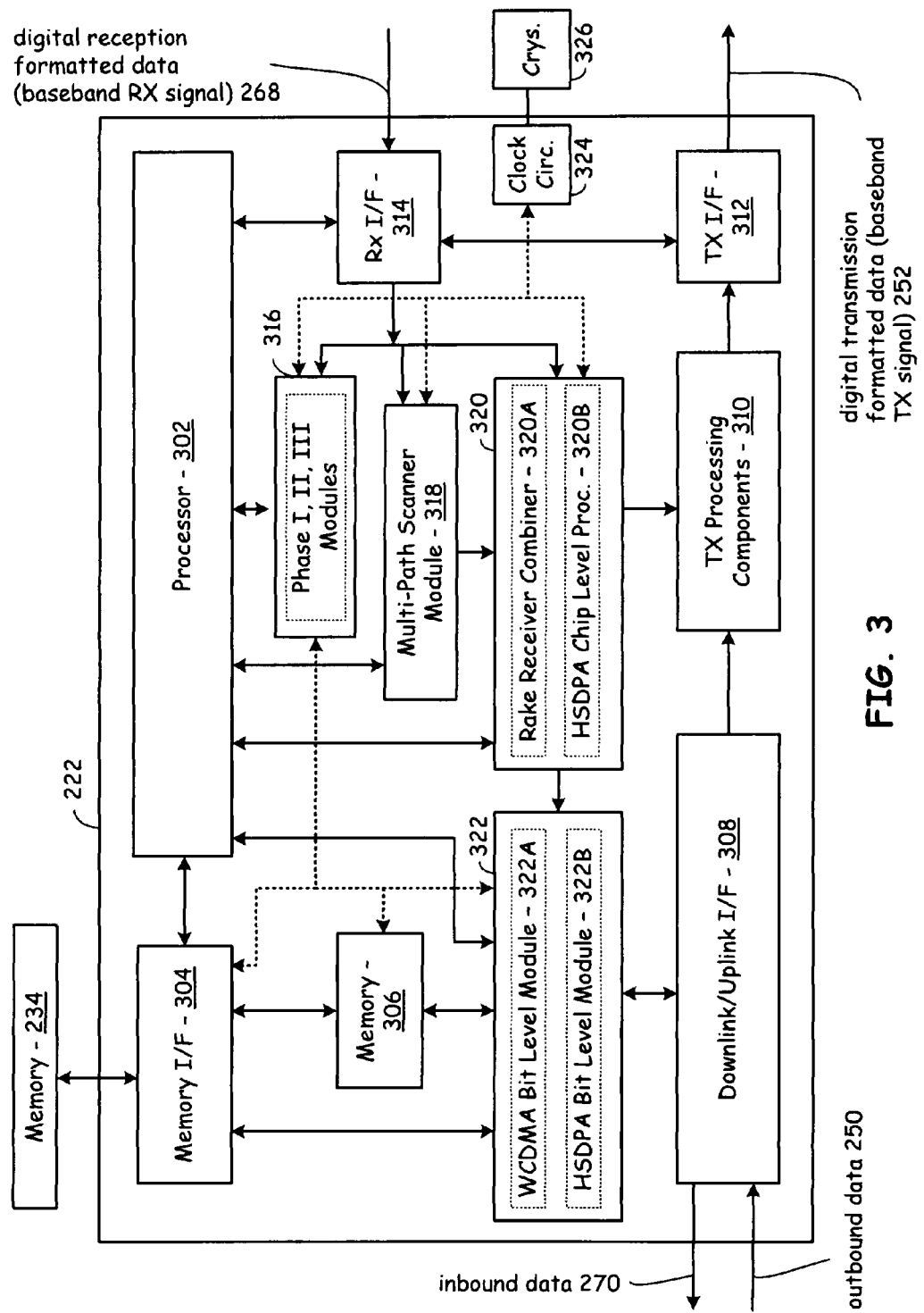
FIG. 3 is a block diagram illustrating components of a baseband processing module according to an embodiment of the present invention.

FIG. 3 is a block diagram illustrating components of a baseband processing module 222 according to an embodiment of the present invention. Components of baseband processing module (baseband processor) 222 include a processor 302, a memory interface 304, onboard memory 306, a downlink/uplink interface 308, TX processing components 310, and a TX interface 312. The baseband processing module 222 further includes an RX interface 314, a cell searcher module 316, a multi-path scanner module 318, a chip level processing module 320, and a bit level processing module 322.

The chip level processing module 320 includes a rake receiver combiner 320A that generally supports WCDMA receive processing operations and a HSDPA chip level processing module 320B that generally, supports HSDPA receive processing operations. The bit level processing module 322 includes a WCDMA bit-level processing module 322A that supports WCDMA bit-level operations and a HSDPA bit-level processing module 322B that supports HSDPA bit-level operations.

The baseband processing module 222 couples in some embodiments to external memory 234. However, in other embodiments, memory 306 fulfills the memory requirements of the baseband processing module 302. According to some aspects of the present invention, memory 306 is cacheable while memory 234 is non-cacheable. Of course, in other embodiments, memory 234 may also be cacheable. As was previously described with reference to FIG. 2, the baseband processing module receives outbound data 250 from coupled host processing components 202 and provides inbound data 270 to the coupled host processing components 202. Further, the baseband processing module 222 provides digital formatted transmission data (baseband TX signal) 252 to a coupled RF front end. The baseband processing module 222 receives digital reception formatted data (baseband RX signal) 268 from the coupled RF front end. As was previously described with reference to FIG. 2, an ADC 222 produces the digital reception formatted data (baseband RX data) 268 while the DAC 236 of the RF front end receives the digital transmission formatted data (baseband TX signal) 252 from the baseband processing module 222.

According to one particular embodiment of the present invention, the downlink/uplink interface 308 is operable to receive the outbound data 250 from coupled host processing components, e.g., the host processing component 202 via host interface 220. Further, the downlink/uplink interface 308 is operable to provide inbound data 270 to the coupled host processing components 202 via the host interface 220. As the reader will appreciate, the baseband processing module 222 may be formed on a single integrated circuit with the other components of radio 204. Further, the radio 204 may be formed in a single integrated circuit along with the host processing components 202. Thus, in such case, all components of FIG. 2 excluding the antenna, display, speakers, et cetera and keyboard, keypad, microphone, et cetera may be formed on a single integrated circuit. However, in still other embodiments, the baseband processing module 222 and the host processing components 202 may be formed on a separate integrated circuit. Many differing integrated circuit constructs are possible without departing from the teachings of the present invention.

TX processing components 310 and TX interface 312 communicatively couple to the RF front end as illustrated in FIG. 2 and to the downlink/uplink interface 308. The TX processing components 310 and TX interface 312 are operable to receive the outbound data from the downlink/uplink interface 304, to process the outbound data to produce the baseband TX signal 252 and to output the baseband TX signal 252 to the RF front end as was described with reference to FIG. 2.

RX processing components including the cell searcher module 316, multi-path scanner module 318, chip level processing module 320, and in some cases the processor 302 are operable to receive the RX baseband signal 268 from the RF front end as processed by the RX I/F 314. Generally, the RX I/F 314 produces soft symbols representing the digital reception formatted data 268 in a format suitable for use by these components. The HSDPA chip level processing module 320B is operable to produce soft symbols output for use by the HSDPA decoding module 322B of the bit level processing module 322. The HSDPA bit level processing module 322B includes Hybrid Automatic Retransmission (HARQ) and IR processing components and Turbo decoding component.

The cell searcher module 316 includes Phase I (PSYNC), Phase II, and Phase III cell search components that will be further described further herein as they relate to the present invention. Clock circuitry 324 generates a wireless terminal clock using input from crystal oscillator 326. As was previously described with reference to FIG. 1, the crystal oscillator 326 has a lesser accuracy than a crystal oscillator used by a servicing base station/node B. Thus, a wireless terminal clock generated by clock circuitry 324 and used by other components of baseband processing module 222 is not as accurate as a base station clock that is used to generate signals transmitted by the base station/node B. As is shown, the dotted line extending from clock circuitry 324 is received by the cell searcher module 316 that includes Phase I (PSYNC), Phase II, and Phase III cell search modules. Further, the clock circuitry 324 is received by the multipath scanner module 318, the chip level processing module 320, and other of the components of baseband processing module. The manner in which a Phase I (PSYNC) module uses the clock signal received from clock circuitry 324 will be described further herein with reference to FIGS. 8-25.

According to another aspect of the present invention, the Phase I (PSYNC) module of the cell search module 316 shares memory with the bit level processing module 322. During initial cell search operations, the bit level processing module 322 does not perform bit level processing because base station acquisition has not yet occurred. Further, during such Phase I cell search operations, the PSYNC module of the cell search module 316 requires additional memory. Thus, during such operations, the PSYNC module (Phase I module) of the cell search module 316 uses the shared memory. However, during other operations, the PSYNC module of the cell search module 316 does not use the shared memory and such memory is used solely by the bit level processing module 322. Such shared memory may be memory 306 and/or memory 234.

According to one particular aspect of such memory sharing operations, the PSYNC module of the cell searcher module 316 uses the bit level processing module 322 memory for storage of PSYNC correlation energies during first synchronization operations. Then, during second synchronization operations, the PSYNC module of the cell searcher module 316 does not use the bit level processing module 322 memory for storage of the PSYNC correlation energies. The first synchronization operations may occur during initial cell search operations while the second synchronization operations occur during neighbor cell search operations, after the wireless terminal has synchronized with a first servicing base station.

Figure 4A:
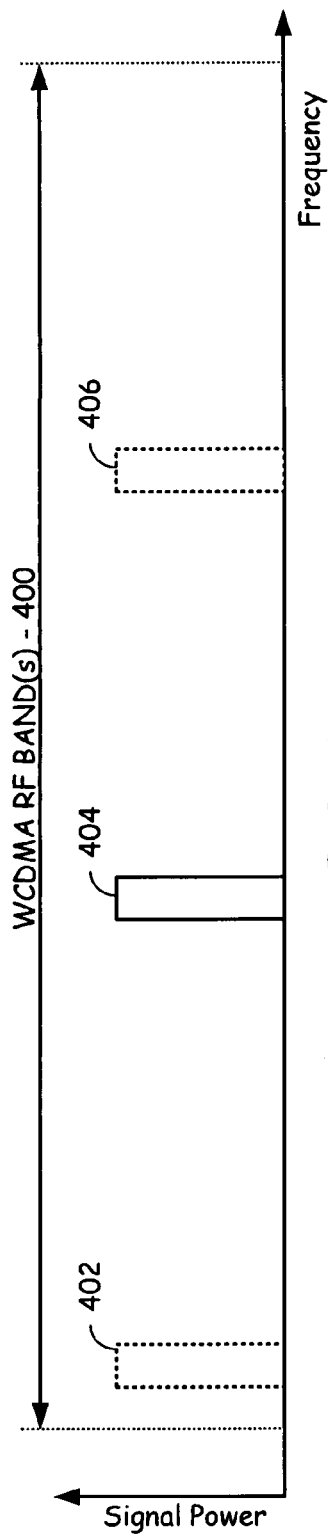
FIG. 4A is a graph illustrating diagrammatically the power spectral density of WCDMA RF band(s) supporting multiple RF carriers.

FIG. 4A is a graph illustrating diagrammatically the power spectral density of WCDMA RF band(s) 400 supporting multiple RF carriers 402, 404, and 406. The WCDMA RF band(s) 400 extend across a frequency spectrum and include WCDMA RF carriers 402, 404, and 406. According to one aspect of the present invention, the cell searcher module 316 of the baseband processing module 222 of an RF transceiver that supports WCDMA operations according to the present invention is operable to scan the WCDMA RF band(s) 400 to identify WCDMA RF energy of at least one WCDMA carrier 402, 404, or 406. During initial cell search operations, the cell searcher module 316 will, in combination with other components of the baseband processing module 222, identify a strongest WCDMA carrier, e.g., 404. Then, the cell searcher module 316 synchronizes to WCDMA signals within the WCDMA carrier 404. These WCDMA signals corresponding to a particular base station cell or sector. In these initial cell search synchronization operations, the cell searcher module 316 preferably synchronizes to a strongest cell/sector.

WCDMA signals transmitted from multiple base stations/sectors may use a common WCDMA RF carrier 404. Alternately, the WCDMA signals from differing base stations/sectors may use differing WCDMA carriers, e.g., 402 or 406. According to the present invention, the cell searcher module 316 and the baseband processing module 222 are operable to synchronize to WCDMA signals from differing cells/sectors operating in one or more of the WCDMA RF bands 402, 404, or 406. Such synchronization operations occur not only for initial cell search but for neighbor cell search or detected cell search operations. The reader should note that the WCDMA RF bands 402, 404, and 406 are not shown as being adjacent in FIG. 4A. Of course, in many systems, WCDMA RF bands may reside adjacent one another with a required channel separation.

Figure 4B:
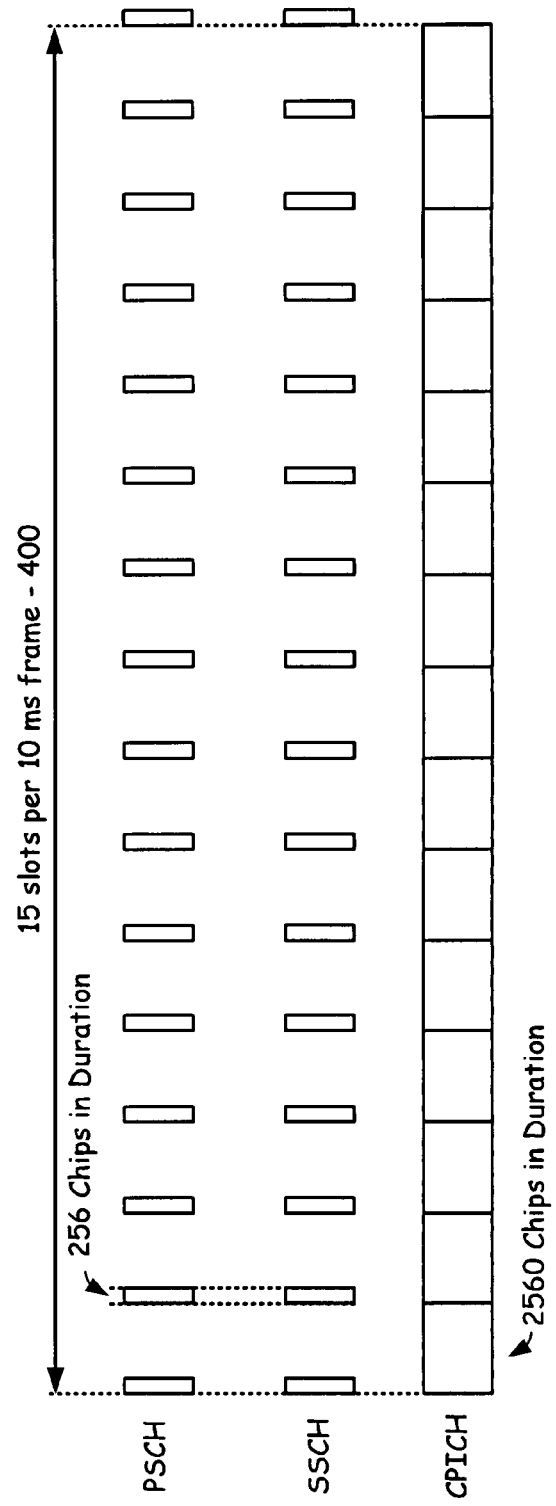
FIG. 4B is a block diagram diagrammatically illustrating the timing of various channels of a WCDMA system employed for cell searching and base station synchronization according to the present invention.

FIG. 4B is a block diagram diagrammatically illustrating the timing of various channels of a WCDMA system employed for cell searching and base station synchronization according to the present invention. The WCDMA signal illustrated has a 15 slot frame structure that extends across 10 ms in time. The WCDMA signal includes a Synchronization Channel (SCH) and a Common Pilot Channel (CPICH), which are introduced in the downlink to assist wireless transceivers in performing cell search operations. The SCH is further split into a primary SCH (PSCH) and a secondary SCH (SSCH). The PSCH carries a primary synchronization code (PSC) which is chosen to have good periodic auto correlation properties and the secondary SCH (SSCH) carries a secondary synchronization code (SSC). The PSCH and the SSCH are constructed such that their cyclic-shifts are unique so that reliable slot and frame synchronization can be achieved. The PSCH and the SSCH are 256-chips long with special formats and appear 1/10 of each time slot. The rest of time slot is Common Control Physical Channel (CCPCH). As shown in FIG. 4A, the PSCH and the SSCH are transmitted once in the same position in every slot. The PSCH code is the same for all time slots, and therefore is used to detect slot boundary. The SSCH is used to identify scrambling code group and frame boundary. Thus, the SSCH sequences vary from slot to slot and are coded by a code-book with 64 code-words (each representing a code-group). The CPICH carries pre-defined symbols with a fixed rate (30 kbps, hence 10 symbols per time slot) and spreading factor of 256. The channelization code for CPICH is fixed to the $0^{th}$ code.

According to the present invention, the cell searcher module 316 of the baseband processing module 222 of a WCDMA RF transceiver are operable to: (1) scan for WCDMA energy within a baseband RX signal received at the RX interface corresponding to the WCDMA signal; (2) acquire a slot synchronization to the WCDMA signal based upon correlation with the PSCH of the WCDMA signal; (3) acquire frame synchronization to, and identify a code group of, the received WCDMA signal based upon correlation with the SSCH of the WCDMA signal; and (4) identify the scrambling code of the WCDMA signal based upon correlation with the CPICH of the WCDMA signal.

The PSYNC module of the present invention is employed to acquire the slot synchronization to the WCDMA signal based upon correlation with the PSCH of the WCDMA signal. According to the present invention, the PSYNC module is further able to estimate a frequency offset between a wireless terminal clock and a base station clock that was used to generate the WCDMA signal. The PSYNC module is further operable to generate WCDMA signal quality characterizations, to make early termination decisions, and to assist with subsequent cell search operations. The various constructs and operations of the PSYNC module will be described further with reference to FIGS. 8-25.

FIG. 5A is a graph illustrating an example of a multi-path delay spread at a first time, T1. As is known, in wireless communication systems, a transmitted signal may take various routes in propagating from an RF transmitter to an RF receiver. Referring briefly again to FIG. 1, transmissions from base station 103 to wireless terminal 116 may take multiple paths with each of these multiple paths arriving in a corresponding time frame. These multiple received copies of the transmitted signal are typically referred to as "multi-path" signal components. Each multi-path signal component may also be referred to herein as a "path". Referring again to FIG. 5A, an example of a delay spread that includes multi-path signal components and their corresponding signal strength for time T1 is shown.

Serving cell multi-path signal components 504 include paths 508, 510, 512, and 514 that are received at respective times with respect to a periodic reference time. Neighbor cell multi-path signal components 506 include paths 516, 518, and 520. Note that the serving cell multi-path signal components 504 and neighbor cell multi-path signal components 504 and neighbor cell multi-path signal components arrive at differing times with respect to a reference time since they are not time aligned. As is known, multi-path signal components of a transmitted RF signal arrive in a time skewed manner at the RF receiver. As is also known, the number of received multi-path signal components and the signal strength and signal to interference ratio of each multi-path signal component varies over time.

FIG. 5B is a graph illustrating the example of the multi-path delay spread of FIG. 5A at a second time, T2. Because the characteristics of the channel from the RF transmitter to the RF receiver changes over time, so does the serving cell multi-path signal components 504 and neighbor cell multi-path signal components 506. Thus, for example, the path 508 of FIG. 5B, while having the same time relationship to the periodic reference time as path 508 as shown in FIG. 5A, has a greater signal-to-interference ratio or signal-to-noise ratio than it did in FIG. 5A. Further, path 510 is missing, path 512 is smaller in magnitude, and path 514 is greater in magnitude than are their counterparts of FIG. 5B. In addition, serving cell multi-path signal components 504 include a path 552 that is existent at time T2 but it was not existent at time T1.

The neighbor cell multi-path signal components 506 at time T2 of FIG. 5B also differ from those at time T1 of FIG. 5A. In such case, multi-path signal components 516 and 518 have differing magnitudes at time T2 than they did at time T1. Further, multi-path signal component 520 which was strong at time T1 does not exist at time T2. Moreover, new multi-path signal component 554 at time T2 exists where it did not exist at time T1. The cell searcher module 316, multi-path scanner module 318, and rake receiver module 320 track the existence of these multi-path signal components, synchronize to some of these multi-path signal components, and receive data via at least some of these multi-path signal components.

Figure 6:
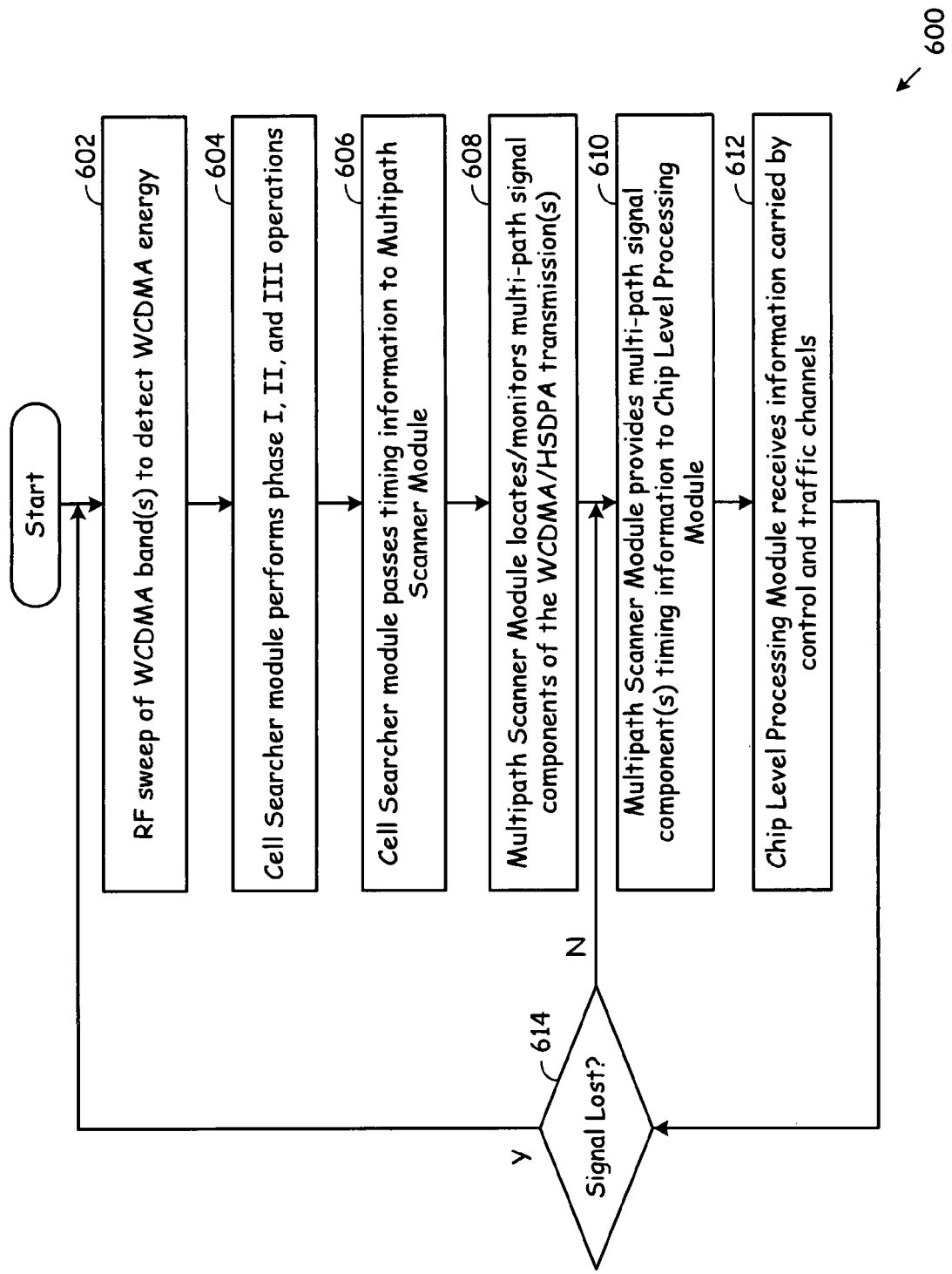
FIG. 6 is a flow chart illustrating operations of a wireless terminal in searching for, finding, synchronizing to, and receiving data from a base station according to an embodiment of the present invention.

FIG. 6 is a flow chart illustrating operations of a wireless terminal in searching for, finding, synchronizing to, and receiving data from a base station according to an embodiment of the present invention. The operations 600 of FIG. 6 are performed by the cell searcher module 316, the multi-path scanner module 318, and the rake receiver module 320 of the baseband processing module 222 of the radio 204 of a wireless terminal constructed according to the present invention. The operations 600 are initiated upon start-up or reset or when the RF terminal is otherwise detecting a serving cell within a WCDMA system and continue during operation of the radio 204 of the wireless terminal. Operation commences with the RF transceiver performing an RF sweep of WCDMA RF bands to detect WCDMA energy (Step 602). The RF sweep of the WCDMA RF bands is a collective effort between the RF front-end components of the RF transceiver radio 204 shown in FIG. 2 as well as the baseband processing module 222 of the radio 204 of FIG. 2. Referring to FIG. 6 and FIG. 3 jointly, in making the RF sweep of the WCDMA RF bands to detect WCDMA energy, the RF front-end tunes to various RF channels within the WCDMA RF bands 400 as shown and discussed with reference to FIG. 4A. With particular references to the components of the baseband processing module 222, the cell searcher module 316 may interact with the processor 302 in order to detect WCDMA energy during the RF sweep of the WCDMA RF bands.

After this RF sweep has been completed at Step 602, the processor 302, in cooperation with the cell searcher module 316 and the RF front-end components, identifies a particular RF band, e.g., 404 of FIG. 4A, in which to detect and synchronize to a WCDMA signal. The cell searcher module 316 of the baseband processing module 222 performs Phase I, Phase II, and Phase III operations in an initial cell search operations (Step 604). In performing its initial cell search operations, the cell searcher module 316 acquires slot synchronization to the WCDMA signal based upon correlation with the PSCH of the WCDMA signal in its Phase I operations. The PSYNC module of the present invention that will be described further herein with reference to FIGS. 8-25 is operable to perform these Phase I operations.

Then, in the Phase II operation, the cell searcher module 316 acquires frame synchronization to, and identifies a code group of, the received WCDMA signal based upon correlation with the SSCH of the WCDMA signal. Then, in its Phase III operations, the cell searcher module 316 identifies the scrambling code of the WCDMA signal based upon correlation with the CPICH of the WCDMA signal. The results of the Phase I, II, and III operations performed by the cell searcher module 316 yield timing information regarding at least one multi-path signal component of the WCDMA signal. In one embodiment, the Phase I, II, and III operations yield timing information and the scrambling code of a strongest multi-path signal component of a WCDMA signal of the selected WCDMA RF carrier.

Operation continues with the cell searcher module 316 passing the timing and scrambling code information to the multi-path scanner module 318 (Step 606). This information may be passed directly or via the processor 302. The multi-path scanner module 318 then locates and monitors multi-path signal components of the WCDMA transmissions (Step 608). The multi-path scanner module 318 then provides the multi-path signal component timing information to the rake receiver combiner module 320 (Step 610). This information may be passed directly or via the processor 302. The rake receiver combiner module 320 then receives information carried by control and traffic channels of the WCDMA signal of the serving cell/sector (Step 612). The RF transceiver continues to receive control and traffic channel information from a serving cell until it decides to either find a new serving cell via neighbor search operations, it loses the signal from the serving cell, or upon another operational determination in which it decides to either terminate receipt of the signal from the serving cell or the carrier is lost. When the signal is lost (Step 614) or in another situation which the RF transceiver decides to move to a different RF carrier, operation proceeds again to Step 602. However, if the RF transceiver determines that continued operation of the particular RF carrier and for the particular serving cell should continue, operation continues to Step 610 again.

Figure 7:
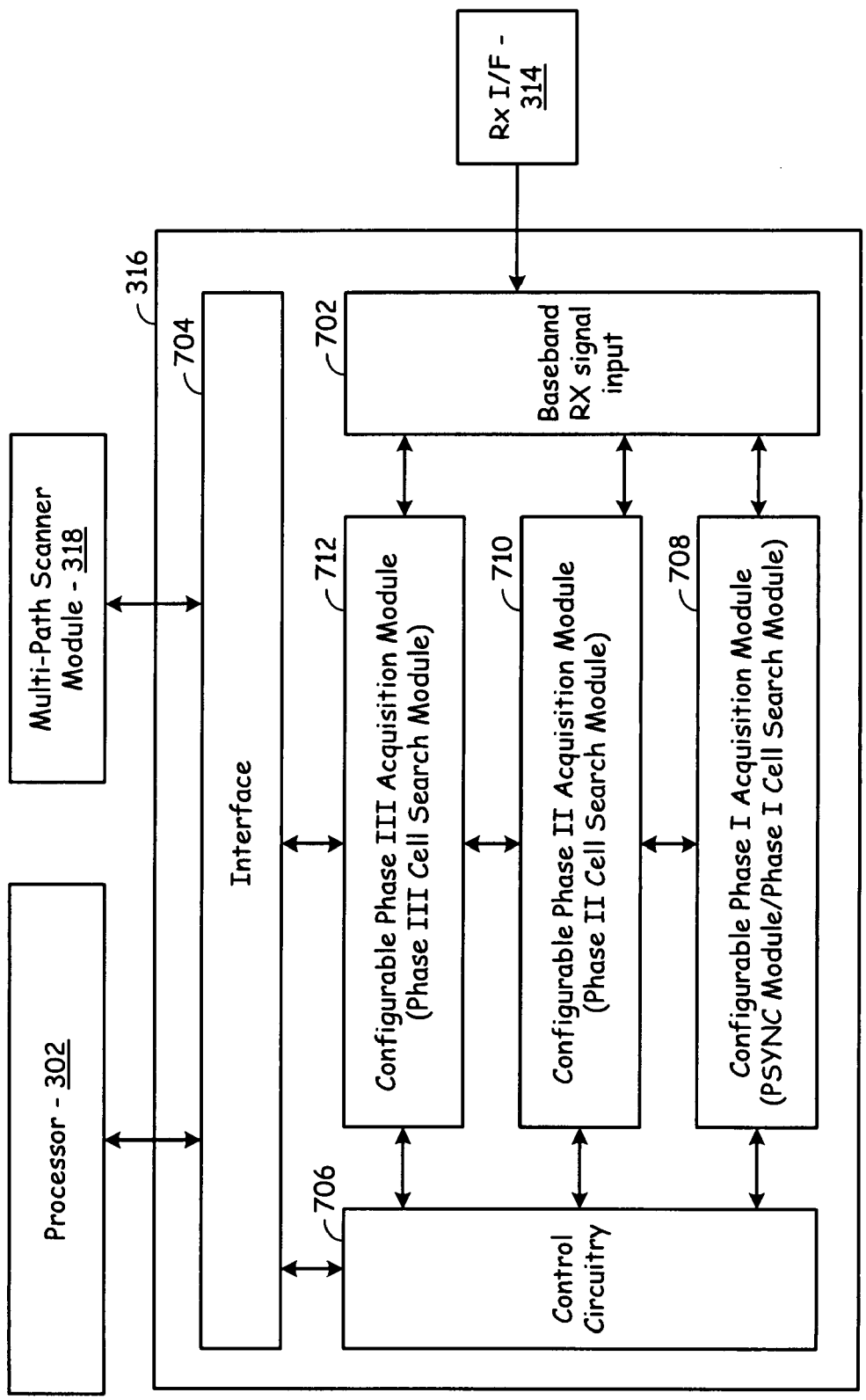
FIG. 7 is a block diagram illustrating a first embodiment of a cell searcher module according to an embodiment of the present.

FIG. 7 is a block diagram illustrating a first embodiment of a cell searcher module 316 according to an embodiment of the present invention. The cell searcher module 316 couples to processor 302, to multi-path scanner module 318, and to RX interface 314. The multi-path scanner module 318 includes a baseband RX signal input 702 that couples to RX interface 314, an interface 704 that couples to processor 302 and multi-path scanner module 318, and control circuitry 706.

The cell searcher module 316 further includes a Phase I acquisition module (PSYNC module) that is operable to acquire slot synchronization to the received WCDMA signal based upon correlation with the PSCH of the WCDMA signal. Particular embodiments of the structure and operations of the configurable Phase I acquisition module 708 will be described further with reference to FIGS. 8-25. The cell searcher module 316 further includes a configurable Phase II acquisition module 710 that is operable to acquire frame synchronization to, and identify the code group of, the received WCDMA signal based upon correlation with the SSCH. Finally, the cell searcher module 316 includes a configurable Phase III acquisition module 712 that is operable to identify the scrambling code of the WCDMA signal based upon correlation with the CPICH of the WCDMA signal. The reader should appreciate that the structure of FIG. 7 is a generalized structure and that more particular structures of the cell search module 316 of the present invention may take differing constructs in differing embodiments.

Figure 8:
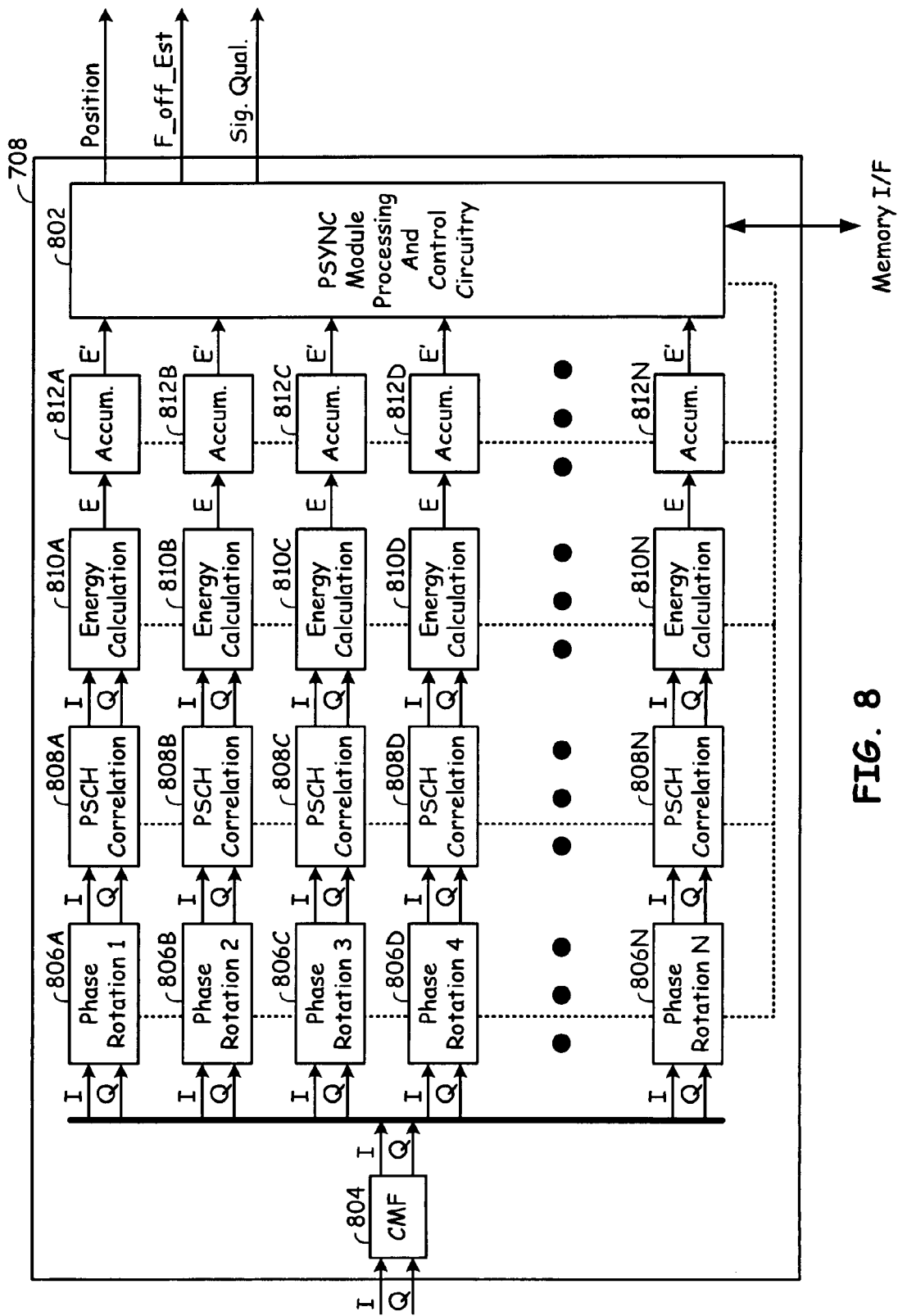
FIG. 8 is a block diagram illustrating a primary synchronization (PSYNC) module constructed according to one or more embodiments of the present invention.

FIG. 8 is a block diagram illustrating a primary synchronization (PSYNC) module constructed according to one or more embodiments of the present invention. The PSYNC module 708 is the Phase I acquisition module 708 of the cell searcher module 316, previously described with reference to FIGS. 3 and 7. A wireless terminal that includes the PSYNC module 708 also includes clock circuitry that is operable to generate a wireless terminal clock using a wireless terminal oscillator. The crystal oscillator of the wireless terminal is less accurate than a crystal oscillator of the base station. Thus, the WCDMA signal produced by the base station is produced using a base station clock that is more accurate than the wireless terminal clock. Stated differently, the base station clock is produced using a base station oscillator that is more accurate than the wireless terminal oscillator.

One particular example used herein is that the base station clock has an accuracy of three PPM while the wireless terminal crystal has an accuracy of 10 PPM. These numbers serve as an example only and the reader should simply understand that the drift between the base station clock and the wireless terminal clock is directly related to the accuracies of the respective crystals used to generate the clocks. In many applications the base station crystal tolerance is very near zero PPM. Because of this, the base station clock may be viewed as a reference frequency and the wireless terminal clock may be viewed as drifting from the base station clock (reference frequency). In any case, the wireless terminal clock may be considered as having some PPM offset relative to the base station clock, where that PPM offset includes any effect of both the wireless terminal's clock PPM offset and the base station's clock PPM offset. The benefit of using a less accurate crystal oscillator with the wireless terminal is a reduction in cost. However, with this reduction in cost, the problem of frequency drift between the wireless terminal clock and the base station clock results. The PSYNC module 708 of FIG. 8 (and as described herein with reference to other of the FIGS.) overcomes this frequency drift problem.

The PSYNC module 708 couples to a wireless interface of the wireless terminal and also to the clock circuitry of the wireless terminal. The wireless interface of the wireless terminal was previously described with reference to FIG. 2 and FIG. 3. The wireless interface is operable to receive the incoming signal that includes the WCDMA signal in some operations. The PSYNC module 708 includes a plurality of PSYNC correlation branches. Each PSYNC correlation branch is operable to phase rotate the WCDMA signal based upon a respective frequently offset. Further, each PSYNC correlation branch is operable to correlate the phase rotated WCDMA signal with a primary synchronization channel (PSCH) code over a plurality of sampling positions. Finally, each PSYNC correlation branch is operable to produce PSYNC correlation energies based upon the correlations for each of the plurality of sampling positions.

The number and spacing of sampling positions of the plurality of PSYNC correlation branches will be described further with reference to FIG. 10C. The respective frequency offsets of the plurality of PSYNC correlation branches will be described further herein with reference to FIGS. 10A and 10B. Various other structures and operations of the PSYNC module will be described further with reference to FIGS. 11A-25.

Referring to the particular construct of the PSYNC module 708 of FIG. 8, each PSYNC correlation branch includes a number of components. Referring to a first PSYNC correlation branch, the PSYNC correlation branch includes a phase rotation block 806A that is operable to phase rotate the incoming signal (that may include the WCDMA signal) based upon the respective frequency offset for the PSYNC correlation branch. The PSYNC correlation branch further includes a PSYNC correlation block 808A that is operable to correlate the phase rotated WCDMA signal with a PSCH code to produce a correlation result. The PSYNC correlation branch further includes an energy calculation block 810A that is operably determined the PSYNC correlation energy based upon the correlation result produced by the PSYNC correlation block 808A. Further, the PSYNC correlation branch includes an accumulator 812A that is operable to accumulate PSYNC correlation energies of common sampling positions.

The PSYNC correlation branch that includes components 806A-812A receives both I and Q inputs from a chip matched filter (CMF) 804. The CMF 804 may be part of the PSYNC module 708 or may be a portion of another block e.g., Rx interface 314 of FIG. 3. In any case, the CMF 804 produces an output to each PSYNC correlation branch of the PSYNC module 708. PSYNC module 708 includes PSYNC module processing and control circuitry 802. The PSYNC module processing and control circuitry 802 receives the PSYNC correlation energy from the accumulator 812A. Further, the PSYNC module processing and control circuitry 802 receives PSYNC correlation energies of common sampling positions from the other accumulators of the other PSYNC correlation branches.

As is also shown, the PSYNC module 708 includes branches B, C, D, and N, which represent N PSYNC correlation branches of the PSYNC module 708. Second PSYNC correlation branch of the PSYNC module 708 includes phase rotation block 806B, PSYNC correlation block 808B, energy calculation block 810B, and accumulator 812B. Likewise, the third PSYNC correlation branch includes phase rotation block 806C, PSYNC correlation block 808C, energy calculation block 810C, and accumulator 812C. Further, the fourth PSYNC correlation branch of the PSYNC module 708 includes phase rotation block 806D, PSYNC correlation block 808D, energy calculation block 810D, and accumulator 812D. Finally, the Nth PSYNC correlation branch of the PSYNC module 708 includes phase rotation block 806N, PSYNC correlation block 808N, energy calculation block 810N, and accumulator 812N.

Each of the blocks 806A-N, 808A-N, 810A-N, and 812A-N is controlled by PSYNC module processing and control circuitry 708. In particular, the accumulator 812A-812N of each PSYNC correlation branch is operable to receive a time drift control input from the PSYNC module processing and control circuitry 802. Generally, as will be described further herein, each of the PSYNC correlation branches is operated with a respective frequency offset. Because of this frequency offset, the respective sampling positions of each of the PSYNC correlation branches will be offset in time from one another. The time drift control input is used to determine a corresponding sampling position by the accumulators 810A to 812N to ensure that the accumulators 812A-812N coherently combine the energy calculations of the PSYNC correlation energies produced by the energy calculation blocks 810A-810N. The content and rationale for receiving such a time drift control input will be described further with reference to FIG. 11A-11C.

As will be described further with reference to FIGS. 10A and 10B, the frequency separation of the respective frequency offsets of the plurality of PSYNC correlation branches is substantially equal in some embodiments. Further, the frequency span of the frequency offsets of the plurality of PSYNC correlation branches is selected based upon an expected maximum frequency offset of the wireless terminal clock of the base station clock. As was previously described, with a 10 PPM tolerance of the wireless terminal crystal oscillator and, resultantly, the wireless terminal clock, a presumed maximum offset with respect to the base station clock may be calculated. Based upon such calculation, the frequency offsets of the PSYNC correlation branches are selected.

The PSYNC correlation operations of the PSYNC correlation blocks 808A-808N are performed based upon the sequence of the PSCH. The PSYNC correlation blocks 808A-808N may be embodied using matched filters of single or multiple stages. Such matched filters, as is generally known, use a combination of adders, multipliers, quantizers, and other elements for correlation of the PSCH code with the incoming WCDMA signal.

Figure 10A:
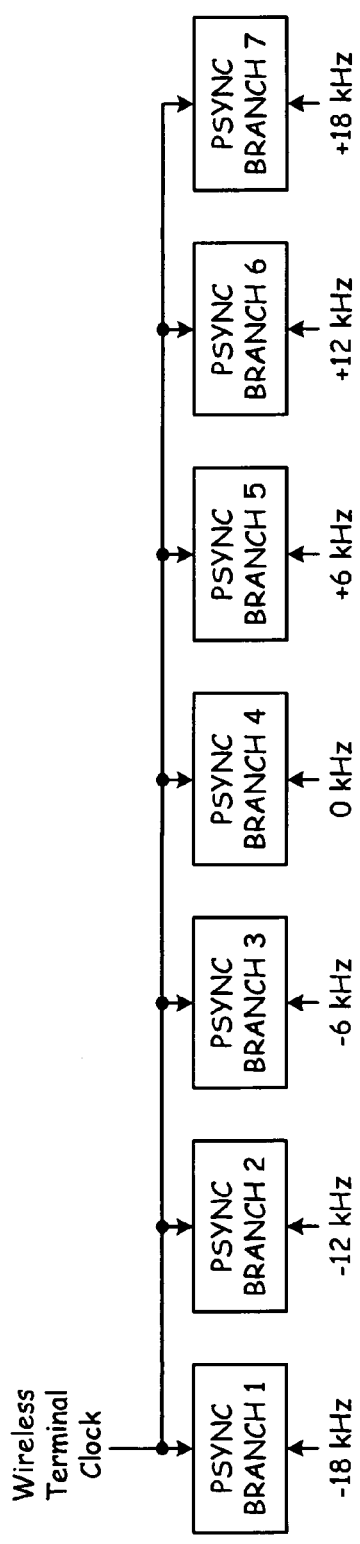
FIG. 10A is a block diagram showing the frequency separations and respective frequency offsets of the plurality of PSYNC correlation branches according to an embodiment of the present invention.
Figure 10B:
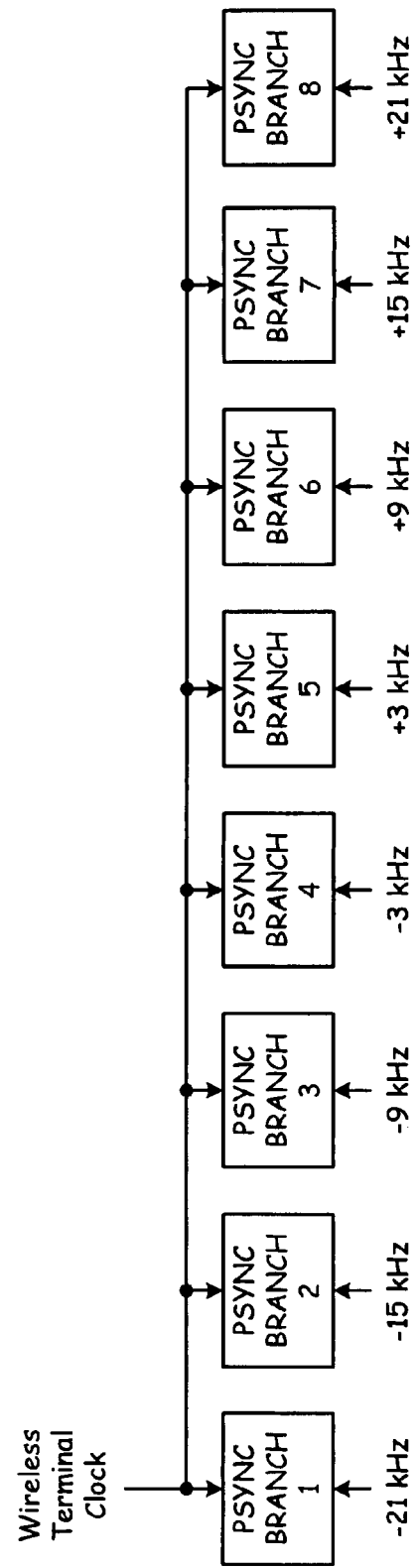
FIG. 10B is a block diagram showing the frequency separations and respective frequency offsets of the plurality of PSYNC correlation branches according to another embodiment of the present invention.
Figure 10C:
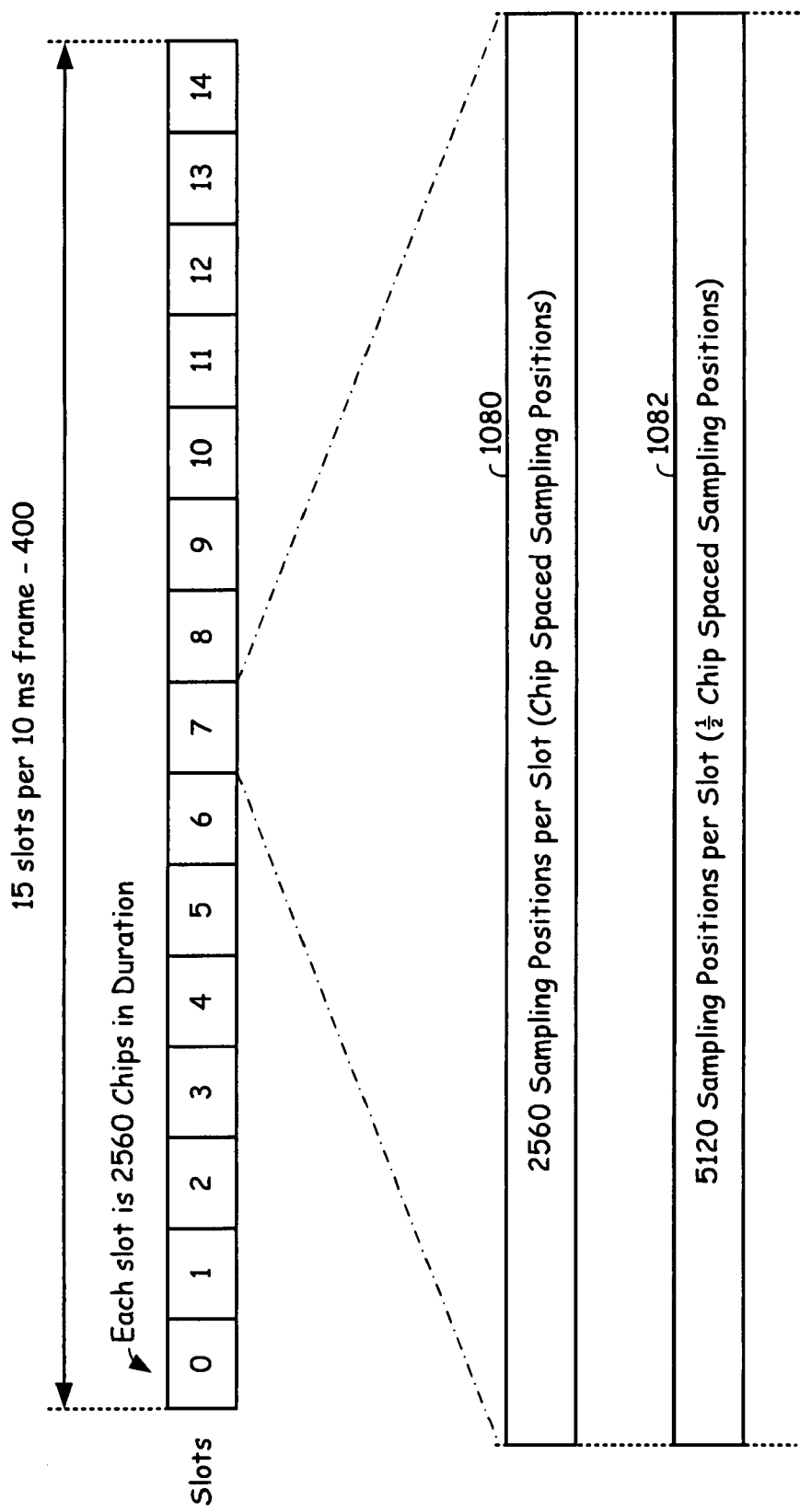
FIG. 10C is a block diagram illustrating two particular embodiments of sampling positions of a PSYNC module according to the present invention.

As will be further described herein with reference to FIG. 10C, the correlation interval over which the PSYNC module 708 operates may be of various durations. For example, the PSYNC correlation module 708 may perform PSCH correlations over a single slot of a WCDMA signal. However, the PSYNC module 708 may perform correlations over multiple slots of the WCDMA signal. The PSYNC module 708 operates upon an WCDMA signal having the timing and chip durations previously described herein with reference to FIG. 4B. Prior wireless terminals, due to the drift of their wireless terminal clocks with respect to base station clocks were required to use a very short correlation length when attempting to synchronize with a base station during cell Phase I acquisition operations. However, because the PSYNC correlation module of the present invention includes the plurality of PSYNC correlation branches each having respective frequency offsets, longer correlation intervals may be used. In one particular example, the PSYNC correlation module 708 performs PSCH correlation operations across one 2,560 chip slot of the WCDMA signal. Using a one-half chip hypothesis position, each PSYNC correlation branch of the PSYNC module produces 5,120 hypotheses. With the PSYNC correlations performed across multiple slots, each PSYNC correlation branch produces coherent accumulation across the multiple slots and to still produce 5,120 hypotheses for a ½ chip spaced hypothesis. When a chip spaced hypothesis is used, each PSYNC correlation branch produce 2,560 hypotheses for each slot, each hypothesis corresponding to a particular sampling position.

According to another aspect of the present invention, the PSYNC module 708 shares memory with the bit level processing module 322 previously illustrated in FIG. 3. In such case, when performing its Phase I cell search operations, the PSYNC module 708 uses the bit level processing module memory 306 or 234 to store the 5,120 times the number of PSYNC correlation branches hypotheses. However, during subsequent cell search operations, the PSYNC module 708 may not require storage of such a large number of hypotheses and will not require usage of the bit level processing module memory. In such case, the bit level processing module would have complete access to the bit level processing module memory. However, in hybrid operations, the PSYNC module 708 would require a portion of the bit level processing module memory but less than is required during initial cell search operations. The memory interface for usage of the bit level processing module memory is shown generally as coupled to the PSYNC module processing and control circuitry 802. However, in other embodiments, the memory interface may be directly coupled to the plurality of accumulators 812A-812N.

As will be described further herein, the PSYNC module 708 is operable to perform a number of other operations based upon its determination of the PSYNC correlation energies of the plurality of sampling positions. Examples of outputs produced by the PSYNC module processing and control circuitry 802 include the positions and maximum PSYNC correlation energies produced by some or all of the PSYNC correlation branches. Further, the PSYNC module processing and control circuitry 802 may determine, based upon the PSYNC correlation energies of a plurality of sampling positions, an estimate of the frequency offset between the wireless terminal clock and the base station clock. Moreover, the PSYNC module and processing control circuitry 708 may produce indicia of the signal quality of the WCDMA signal based upon the PSYNC correlation energies of the plurality of sampling positions of the plurality of PSYNC module correlation branches. Such signal quality parameters may be used further by the wireless terminal in subsequent cell search operations, in terminating the primary cell search operations, and/or in other operations as will be described further herein with reference to FIGS. 9-25.

Figure 9:
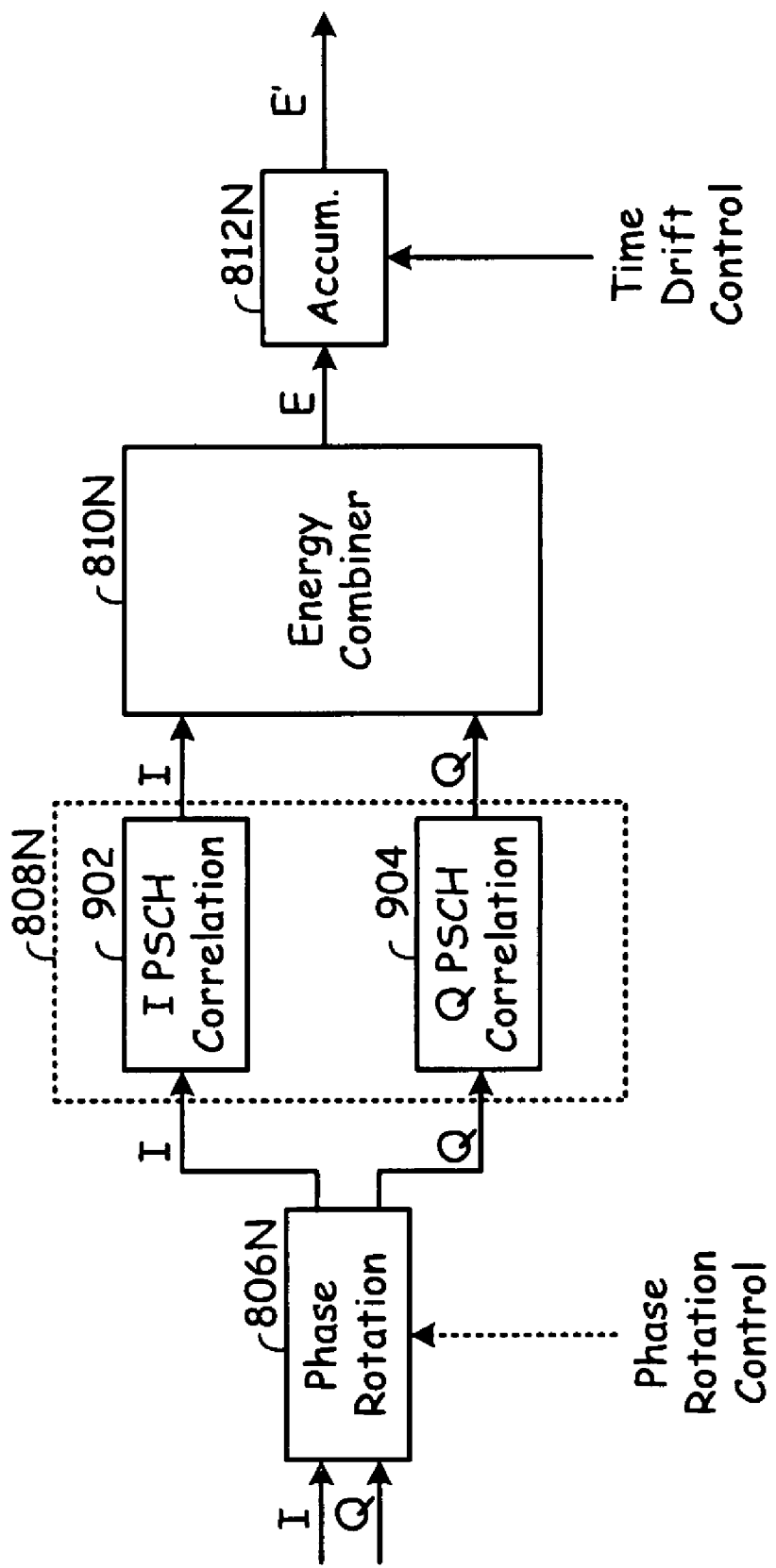
FIG. 9 is a block diagram illustrating components of a PSYNC correlation branch constructed according to one or more embodiments of the present invention.

FIG. 9 is a block diagram illustrating components of a PSYNC correlation branch constructed according to one or more embodiments of the present invention. The single PSYNC correlation branch of FIG. 9 shows in more detail the structure of the PSYNC correlation branch previously illustrated in, and described with reference to FIG. 8. However, the PSYNC correlation branch described with reference to FIG. 9 may be slightly different in construct than that of FIG. 8. The PSYNC correlation branch of FIG. 9 includes phase rotation block 806N. The phase rotation block 806N receives I and Q components of the WCDMA signal (input signal that may include a WCDMA signal). The phase rotation block 806N phase rotates the WCDMA signal based upon the respective frequency offset. The respective frequency offset is represented by phase rotation control received by phase rotation block 806N. The phase rotation block 806N produces I and Q components of a phase rotated WCDMA signal (input signal) to PSYNC correlation block 808N. PSYNC correlation block 808N includes an I Phase PSCH correlation block 902 and a Q phase PSCH correlation block 904. The PSYNC correlation block 808N correlates the phase rotated WCDMA signal (both I and Q components) with I and Q components of a PSCH code to produce correlation results. Energy calculation block 810N receives the output of PSYNC correlation block 808N and is operable to determine a PSYNC correlation energy—or an approximation thereof—based upon the correlation results received. In the particular embodiment of FIG. 9, the energy combiner block 810N determines the magnitude of the I and Q correlation results received. The output of the energy combiner block 810N is received by accumulator 812N. Accumulator 812N coherently accumulates the PSYNC correlation energies. In order to ensure that the accumulation is coherent, the accumulator 812N aligns the PSYNC correlation energies based upon a time drift control input. The accumulated PSYNC correlation energies are coherently combined based upon their common sampling positions.

FIG. 10A is a block diagram showing the frequency separations and respective frequency offsets of the plurality of PSYNC correlation branches according to a first embodiment of the present invention. According to the embodiment of FIG. 10A, the PSYNC module includes seven PSYNC correlation branches. Each of these PSYNC correlation branches includes as an input the wireless terminal clock (that was produced using the wireless terminal oscillator as was previously shown with reference to FIG. 3) and a respective frequency offset. As is shown in FIG. 10A, PSYNC branch 1 receives a respective frequency offset of −18 kHz, PSYNC branch 2 receives a respective frequency offset of −12 kHz, PSYNC branch 3 receives a respective frequency offset of −6 kHz, PSYNC branch 4 receives a respective frequency offset of 0 kHz, PSYNC branch 5 receives a respective frequency offset of 6 kHz, PSYNC branch 6 receives a respective frequency offset of +12 kHz, and PSYNC branch 7 receives a respective frequency offset of +18 kHz. The frequency separation of the respective frequency offsets of the plurality of PSYNC correlation branches, PSYNC branch 1-PSYNC branch 7 is substantially equal. In the particular example of FIG. 10A, the frequency separation between adjacent PSYNC correlation branches is 6 kHz.

Further, the frequency span of the frequency offsets of the plurality of PSYNC branches has been selected based upon expected maximum frequency offset between the wireless terminal clock and the base station clock. Assuming a 10 part-per-million tolerance of the wireless terminal oscillator that is used to produce the wireless terminal clock, the frequency span of FIG. 10A is 36 kHz. With the embodiment of FIG. 10A, it is presumed that the frequency span of 36 kHz is sufficient to account for a maximum frequency offset between the base station clock and the wireless terminal clock. Such presumed maximum frequency offset is, of course, dependent upon the quality of the base station crystal oscillator and the wireless terminal crystal oscillator.

FIG. 10B is a block diagram showing the frequency separations and respective frequency offsets of the plurality of PSYNC correlation branches according to another embodiment of the present invention. The plurality of PSYNC correlation branches of FIG. 10B includes eight (8) PSYNC correlation branches. Each of the PSYNC correlation branches receives the wireless terminal clock and a respective frequency offset. As is shown, PSYNC branch 1 receives a respective frequency offset of −21 kHz, PSYNC branch 2 receives a respective frequency offset of −15 kHz, PSYNC branch 3 receives a respective frequency offset of −9 kHz, PSYNC branch 4 receives a respective frequency offset of −3 kHz, PSYNC branch 5 receives a respective frequency offset of +3 kHz, PSYNC branch 6 receives a respective frequency offset of +9 kHz, PSYNC branch 7 receives a respective frequency offset of +15 kHz, and PSYNC branch 8 receives a respective frequency offset of +21 kHz. With the embodiment of FIG. 10B, the frequency span of the frequency offsets of the plurality of PSYNC correlation branches is 42 kHz, which is greater than the 36 kHz span of the PSYNC module of FIG. 10A. The frequency separation of adjacent PSYNC correlation branches of the embodiment of FIG. 10B is 6 kHz.

FIG. 10C is a block diagram illustrating two particular embodiments of sampling positions of a PSYNC module according to the present invention. Reproduced in FIG. 10C is a representation of a 15 slot per 10 milliseconds WCDMA frame 400. Each slot of the 15 slot WCDMA frame includes 2,560 chips. Thus, with the embodiment illustrated at 1080, with a chip spaced sampling position embodiment, the PSYNC correlation module produces 2,560 PSYNC correlation energies per slot at 2,560 respective sampling positions for each PSYNC correlation branch. Stated differently, each PSYNC correlation branch produces a PSYNC correlation energy for each of the 2,560 sampling positions of the embodiment of 1080. When the PSYNC correlation module performs correlations over multiple slots of the WCDMA signal, each PSYNC correlation branch will perform coherent accumulation of the PSYNC correlation energies across the multiple slots.

With the one-half chip space sampling position embodiment referred to at 1082, each PSYNC correlation branch produce 5,120 PSYNC correlation energies at respective sampling positions for each slot of the WCDMA signal. When the PSYNC correlation module performs correlation and accumulation on multiple slots, each PSYNC correlation branch performs coherent accumulation of the PSYNC correlation energies for each of the respective 5,120 sampling positions per WCDMA signal slot. The term "coherent" is applied here and elsewhere in this document to denote the per-hypothesis accumulations that occur after the I/Q PSCH Correlator output has been converted to energy. The reader should appreciate that this usage of "coherent" is in keeping with one possible use of the word. The term "coherent" may also apply to signals that still have useful phase information (are still separable into I & Q components). The correlation operations may be performed over a portion of a slot, over a complete slot, or over more than one slot. In such case, the correlation interval of operations of the present invention may have a duration that is shorter than a slot duration, equal to a slot duration, or greater than a slot duration. Of course, the correlation operations will not necessarily align with slot boundaries.

Figure 10D:
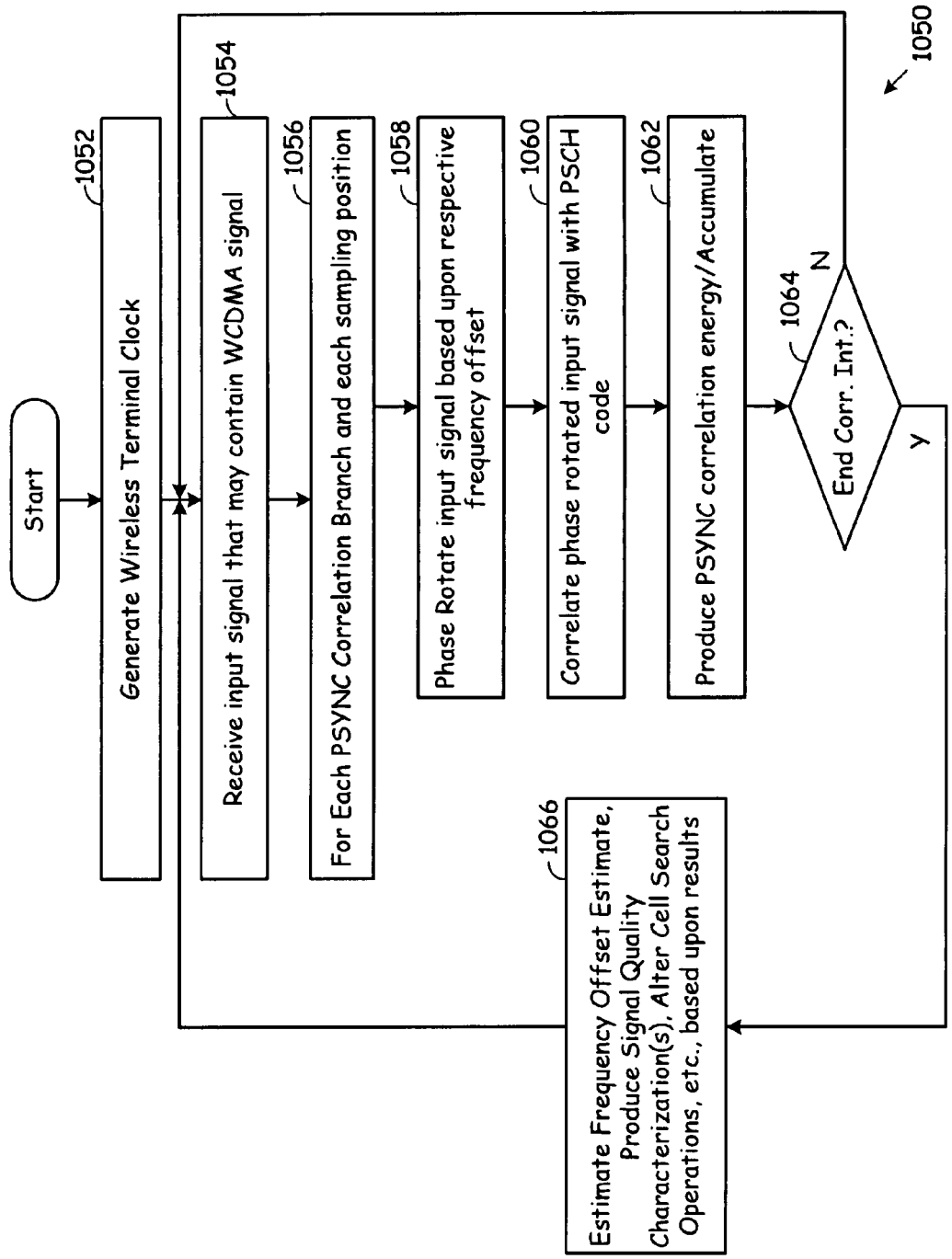
FIG. 10D is a flow chart illustrating generally operations of a PSYNC module operating according to the present invention.

FIG. 10D is a flow chart illustrating generally operations of a PSYNC module operating according to the present invention. The operations 1050 of FIG. 10D commence with the wireless terminal generating a wireless terminal clock using a wireless terminal oscillator (Step 1052). Then, operation 1050 continues with the PSYNC module receiving an input signal that may contain a WCDMA signal (Step 1054). As the reader should appreciate, the PSYNC module is searching for a WCDMA signal that may be present in the input signal. Thus, in the description herein, such input signal may be referred to interchangeably as input signal and WCDMA signal. The operations 1050 of FIG. 10D do not require the presence of the WCDMA signal in the input signal. However, the operations 1050 of FIG. 10D may detect presence of a WCDMA signal in the input signal.

After receipt of the input signal Step 1054, the PSYNC module of the wireless terminal performs a number of operations for each PSYNC correlation branch and for sampling position as indicated at Step 1056. For each sampling position, each of the PSYNC correlation branches phase rotates the input signal based upon a respective frequency offset (Step 1058). Then, for each sampling position, each PSYNC correlation branch correlates the phase rotated input signal with a PSCH code (Step 1060). Then, each PSYNC correlation branch produces a PSYNC correlation energy for the phase rotated input signal and accumulates the PSYNC correlation energy for common sampling positions (Step 1062). For a chip spaced sampling of a PSYNC correlation module, each PSYNC correlation branch produces 2,560 correlation energies for each slot of a WCDMA signal. For a one-half chip spaced sampling position embodiment of the PSYNC correlation branch, each PSYNC correlation branch produces 5,120 PSYNC correlation energies for each slot of the WCDMA signal.

After a pre-determined correlation interval or a correlation interval that is selected during operation of the PSYNC module, operation 1050 determines whether the correlation interval has been completed (Step 1064). If the correlation interval has not ended, e.g., the correlation interval is extending across another slot, operation returns to Step 1054. However, if the correlation interval has ended (as determined at Step 1064), operation proceeds to Step 1066 where the PSYNC module performs additional operations based upon the PSYNC correlation energies that it has produced. These operations may include estimating a frequency offset between the base station clock and the wireless terminal clock, producing one or more signal quality characterizations of the WCDMA signal, altering cell search operations based upon PSYNC correlation energies produced, and/or to perform other operations (Step 1066). Particular embodiments of Step 1066 will be described further herein with reference to FIGS. 14-25. From Step 1066, operation returns to Step 1054 where the operations of the PSYNC module continue.

FIG. 11A is a timing diagram illustrating slippage of PSYNC correlation energies of respective positions across a plurality of PSYNC correlation branches. As was previously described, each of the PSYNC correlation branches performs phase rotation of the WCDMA signal based upon its respective frequency offset. Thus, each of the PSYNC correlation branches is effectively out of sync with each other of the plurality of PSYNC correlation branches from a correlation perspective. Thus, each PSYNC correlation branch must perform time drift control compensation to ensure that correlation of the PSYNC correlation energies is attributed to the correct position.

As is shown generally in FIG. 11A, three PSYNC correlation branches 1152, 1154, and 1156 each have respective frequency offsets. With the example of FIG. 11A, PSYNC correlation branch 1154 is aligned with its servicing base station/base station transceiver subsystem (BTS). However, because PSYNC correlation branch 1152 has a negative frequency offset, its slot timing is compressed with respect to PSYNC correlation branch 1154. Further, because PSYNC correlation branch 1156 is a positive frequency offset, its timing is expanded with respect to PSYNC correlation branch 1154. Thus, there is a time alignment mismatch amongst the branches. Because of this, the PSYNC correlation branches, based upon the time drift control input, must adjust their presumed sampling/correlation positions.

Figure 11B:
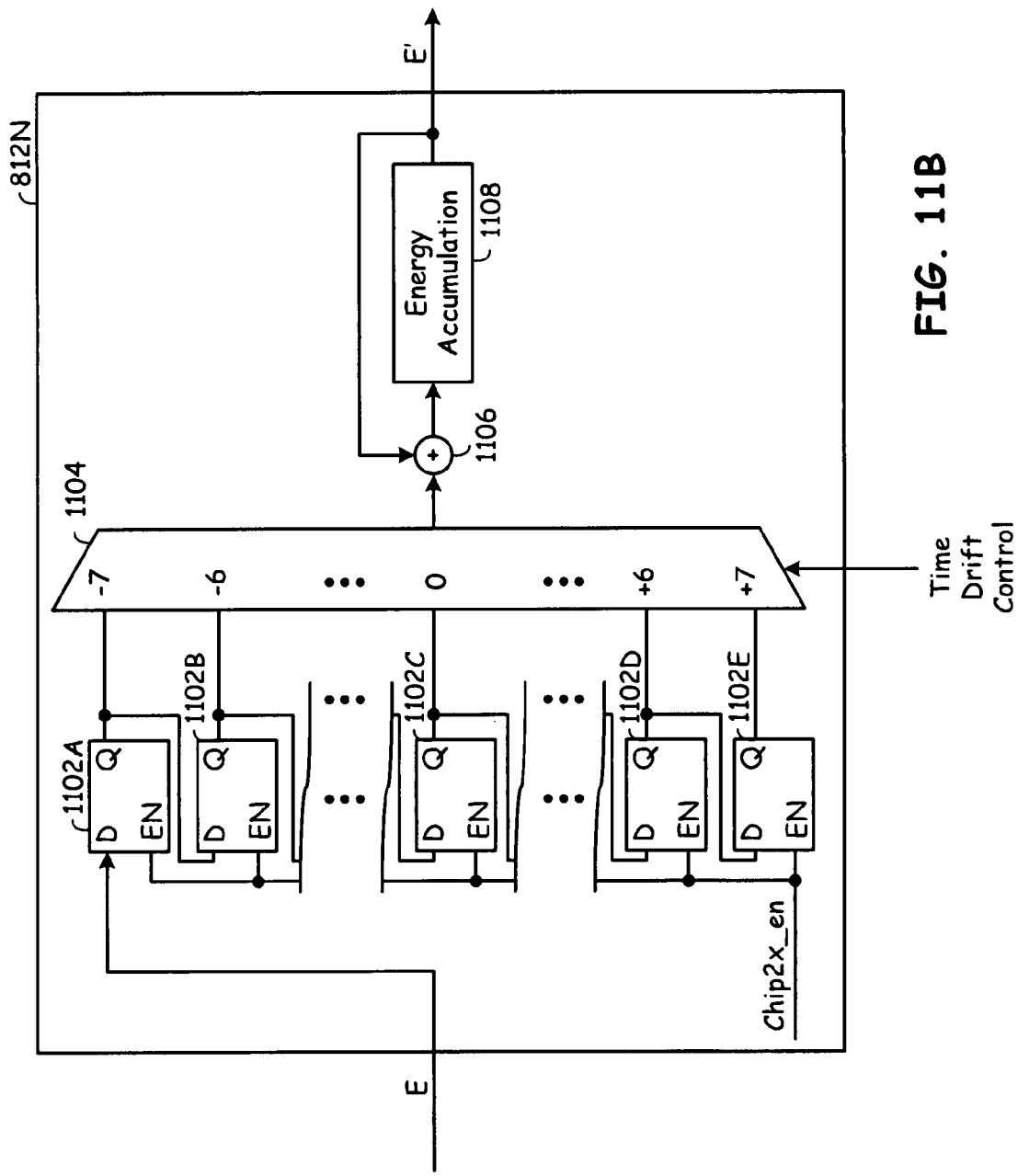
FIG. 11B is a block diagram that functionally illustrates time drift compensation that is performed by an accumulator of a PSYNC correlation branch according to the present invention.

FIG. 11B is a block diagram that functionally illustrates time drift compensation that is performed by an accumulator of a PSYNC correlation branch according to the present invention. Illustrated in particular is accumulator 812N of the Nth PSYNC correlation branch of PSYNC module 708. The accumulator 812N receives PSYNC correlation energy from the energy calculation block 810N of branch N of PSYNC module 708. The accumulator 812N includes a plurality of D flip-flops 1102A-1102E (or some other memory device with functionality equivalent to that pictured; e.g., an SRAM under logic control), similarly illustrated, and which are enabled by chip2x_en input signal. The D input of the first D flip-flop 1102A receives the PSYNC correlation energy output by energy calculation block 810N. The Q output of D flip-flop 1102A is received as multiplexer 1104 input +7. The Q output of D flip-flop 1102A is also received as the D input of D flip-flop 1102B. The D flip-flops each produce a Q output to the multiplexer at a respective input and also as a chained input to their adjacent D flip-flops.

In the embodiment of FIG. 11B, the multiplexer 1104 receives 15 inputs from 15 respective D flip-flops. The time drift control signal serves as a selection input to multiplexer 1104. Time drift control input, provided by the PSYNC module processing and control circuitry 802 of the PSYNC module 708, causes the appropriate sampling position PSYNC correlation energy to be output to summation block 1106. The output of summation block 1106 is received by energy accumulation block 1108. The output of summation block 1106 is the accumulated PSYNC correlation energy for the appropriate sampling position. The output of energy accumulation block 1108 is also received as an input by summation block 1106.

Figure 11C:
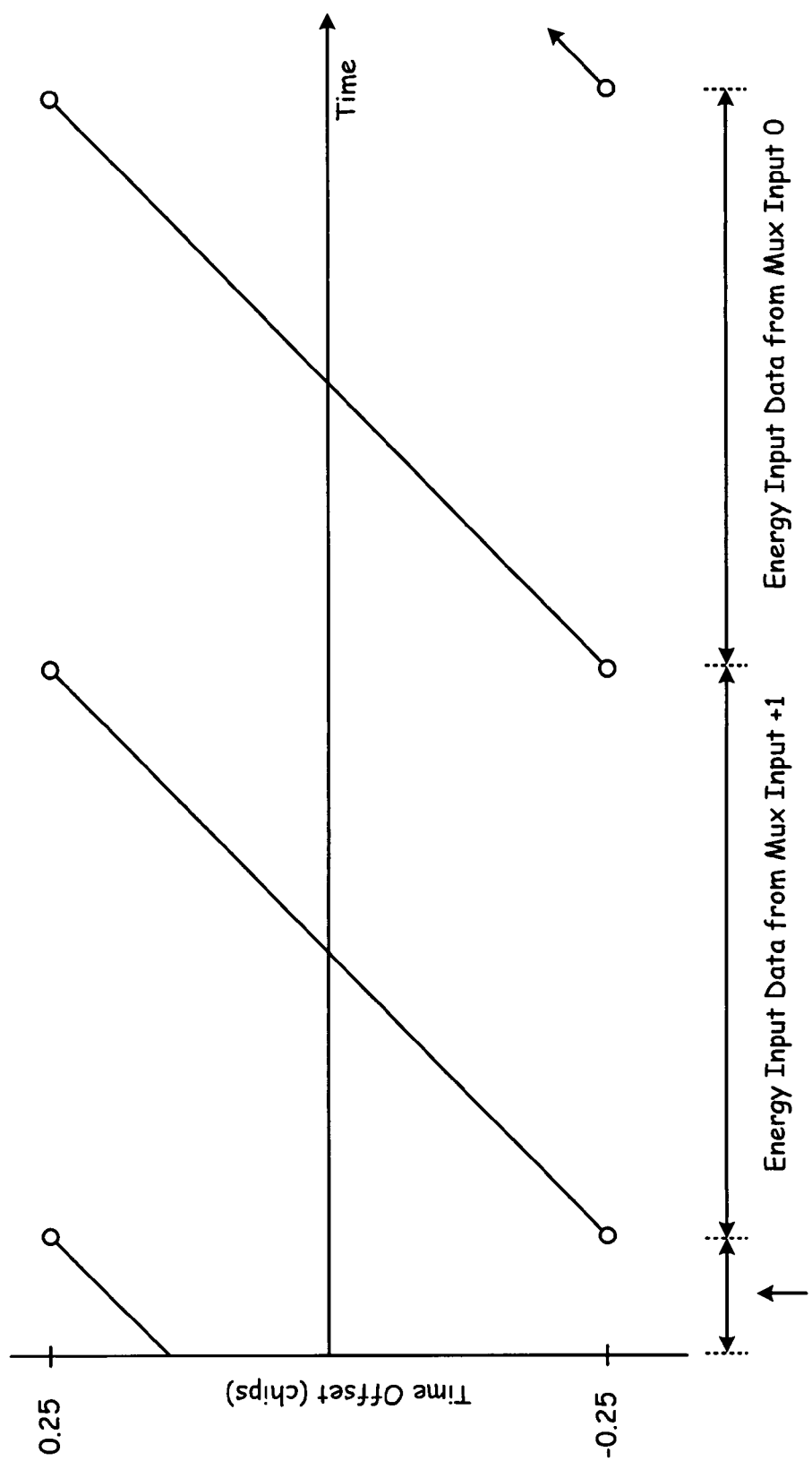
FIG. 11C is a graph illustrating the manner in which the time drift control signal is used to select a particular input from one of the D flip-flops of FIG. 11B.

FIG. 11C is a graph illustrating the manner in which the time drift control signal is used to select a particular input from one of the D flip-flops 1102A-1102E of FIG. 11B. The graph of FIG. 11C presumes a 10 PPM difference between the base station clock and the wireless terminal clock. In such case, 10 part-per-million difference between the base station clock and the wireless terminal clock implies a slippage of one chip per approximately every 26 milliseconds. The slope of the slippage graph of FIG. 11C presumes such 10 part-per-million slippage between the base station clock and the wireless terminal clock. Without time drift control, input the slippage over 20 milliseconds would be approximately 0.77 chips. With such slippage, the accumulation period that the PSYNC module could employ would be much shorter than with the time drift control compensation. Thus, whenever a time offset exceeds one-quarter chip, a differing input to multiplexer 1104 of accumulator 812N is selected. By selecting a different input (or tap) according to such intervals, the actual time offset error of the sampling positions for the accumulation operations will never exceed one-quarter chip.

Figure 12:
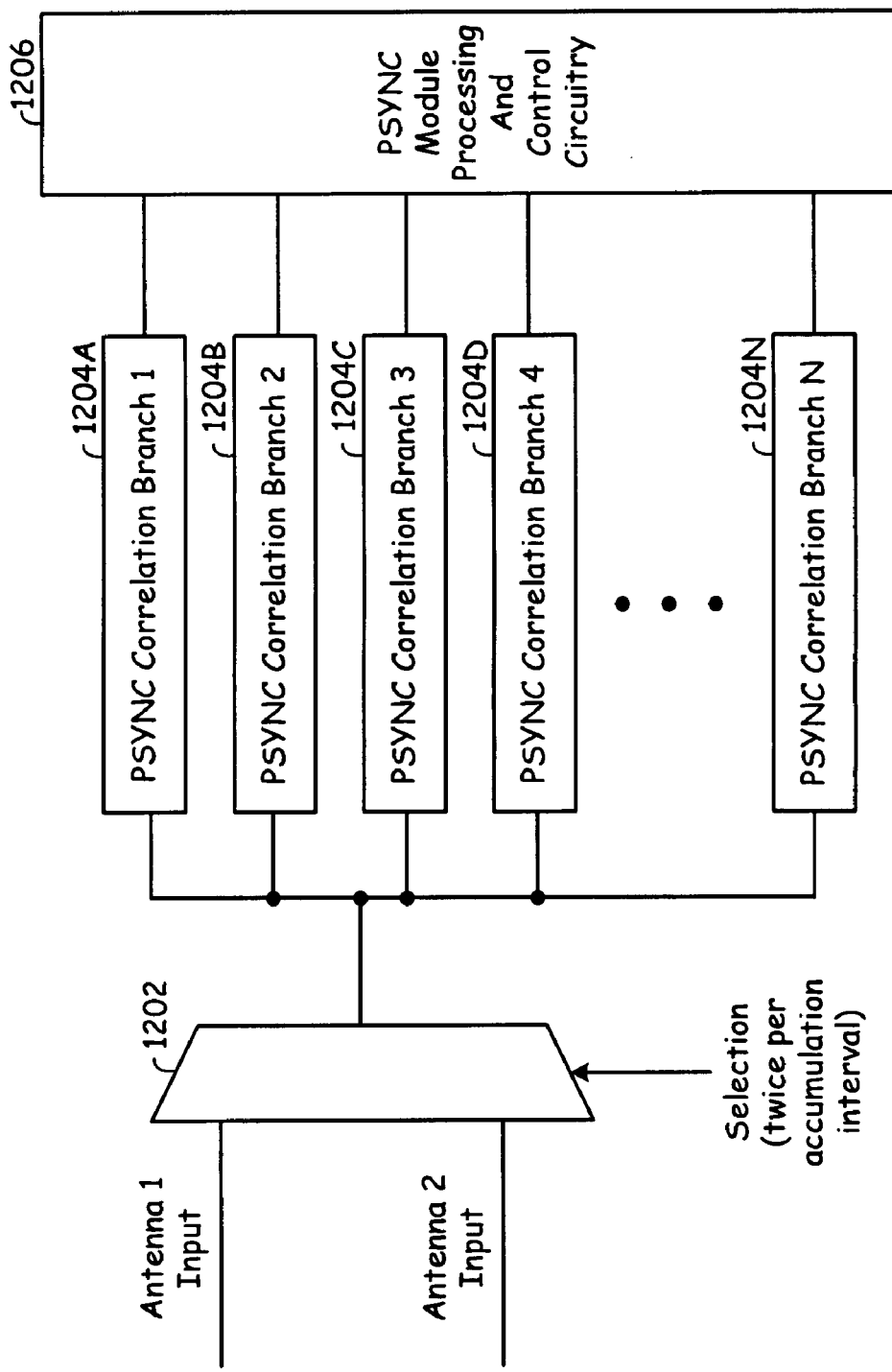
FIG. 12 is a block diagram illustrating generally the structure of a PSYNC correlation module constructed according to the present invention that supports the receipt of a diversity WCDMA signal from a base station.

FIG. 12 is a block diagram illustrating generally the structure of a PSYNC correlation module 1200 constructed according to the present invention that supports the receipt of a diversity WCDMA signal from a base station. The structure 1200 of FIG. 12 may be implemented in a device that also supports non-diversity operations. Thus, the structure of 1200 of the PSYNC correlation module has many common components with the structures of the PSYNC modules illustrated previously. Some of particular structures that have previously been described will not be described further herein except as how they relate to the diversity operations of the PSYNC module 1200 of FIG. 12.

Generally, the PSYNC module 1200 of FIG. 12 operates upon diversity WCDMA signal received via two antennas. In particular, the diversity WCDMA signal is received via antenna 1 input and antenna 2 input. As is generally known, with receiver diversity, transmitted signals are received on two differing antennas separated by sufficient distance and/or polarization such that signals received on each antenna are fairly uncorrelated with respect to one another. By intelligently combining or selecting information from each receiver antenna, a receiving device is able to effectively produce a better quality signal that would otherwise be the case if only a single receiver antenna were present.

The PSYNC module 1200 includes a plurality of PSYNC correlation branches 1204A-1204N. The PSYNC module 1200 further includes PSYNC module processing and control circuitry 1206. Further details of the PSYNC module are not described or shown in FIG. 12 but are similar to those previously described with reference to PSYNC module 708 of FIG. 8. According to the structure of FIG. 12, the WCDMA diversity signal received via antenna 1 input and antenna 2 are input to multiplexer 1202. The multiplexer 1202 is switched via selection input at twice the sampling position duration of the plurality of PSYNC correlation branches 1204A-1204N. Thus, for each sampling position, the plurality of PSYNC correlation branches 1204A-1204N samples both the input received via antenna 1 and the input received via antenna 2. According to the embodiment of the PSYNC module 1200 of FIG. 12, the PSYNC correlation branches 1204A-1204N are operable to combine the correlations produced for each of the input signals received via antenna 1 input and antenna 2.

Stated differently, the PSYNC module 1200 of FIG. 12 is coupled to a wireless interface and also to clock circuitry (although clock circuitry is not shown explicitly in FIG. 12). Multiplexing circuitry 1202 has two inputs coupled to two receive paths of the wireless interface for receipt of the diversity WCDMA signal. Each of the plurality PSYNC correlation branches includes phase rotation circuitry, correlation circuitry, and accumulation circuitry. The PSYNC correlation module 1200 of FIG. 12 operates upon the diversity WCDMA signal such that the multiplexing circuitry 1202 couples a first one of receive paths (antenna 1 input) to the plurality of PSYNC correlation branches 1204A-1204N during first time intervals. Further, the multiplexing circuitry 1202 operates to couple the second one of the receive paths (antenna 2 input) to the plurality of PSYNC correlation branches 1204A-1204N during second time intervals. The accumulators of the PSYNC correlation branches are operable to combine the diversity WCDMA signal components received via the first and second receive paths to provide a better indication of the quality of the diversity WCDMA signals. In such case, each of the plurality of PSYNC correlation branches 1204A-1204N is operable to combine PSYNC correlation energies of the two of the diversity WCDMA signal received via the first and second receive paths with common sampling positions.

Figure 13:
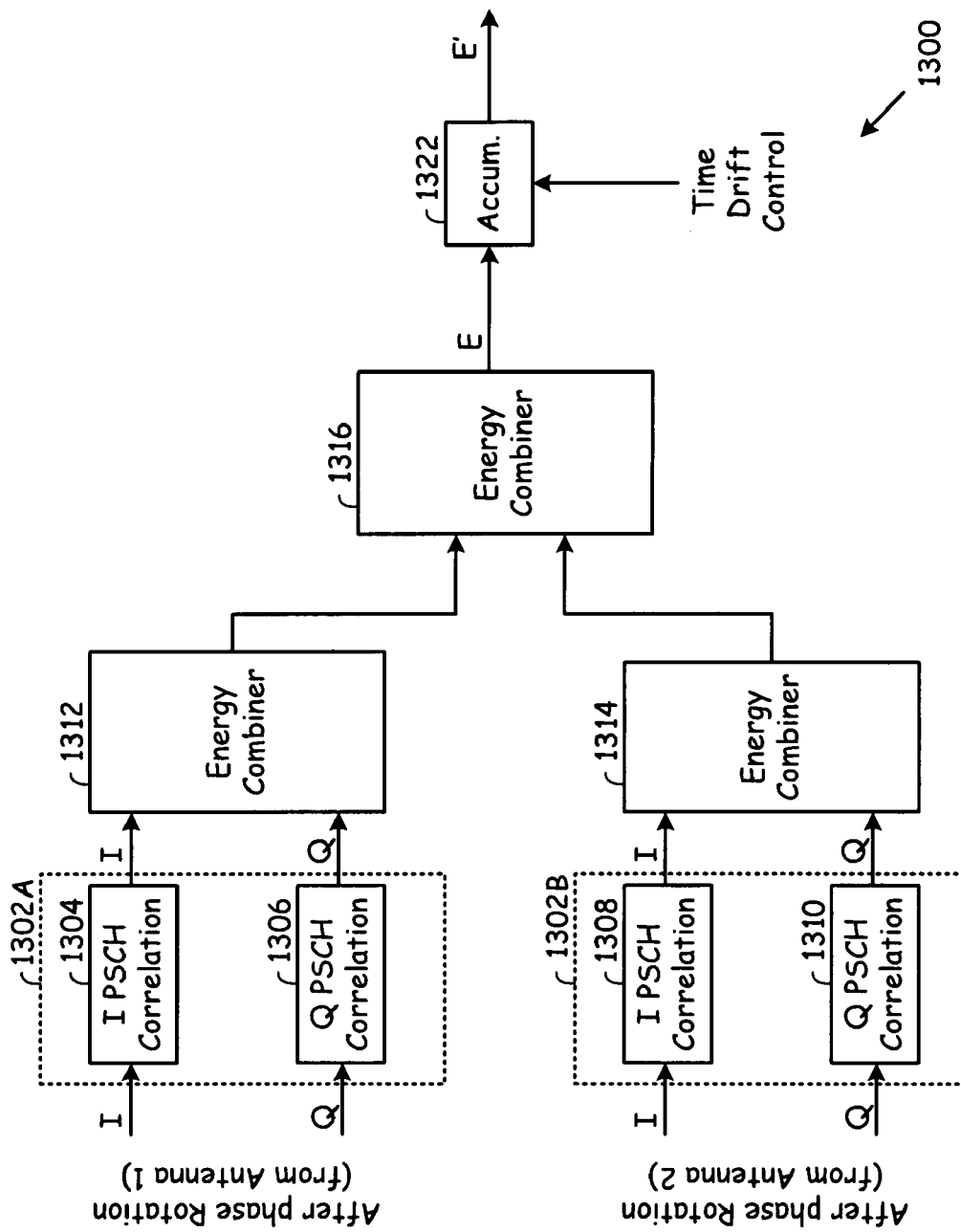
FIG. 13 is a block diagram illustrating alternate construct of a PSYNC module that operates upon a diversity WCDMA signal according to embodiments of the present invention.

FIG. 13 is a block diagram illustrating alternate construct of a PSYNC module 1300 that operates upon a diversity WCDMA signal according to embodiments of the present invention. In particular, the PSYNC correlation module 1300 components illustrated in FIG. 13 include PSYNC correlation blocks 1302A and 1302B that operate upon respective inputs of the two receive paths. Correlation block 1302A couples to a first receive path corresponding to antenna 1. Correlation block 1302A includes I PSCH correlation block 1304 and Q PSCH correlation block 1306. Each of the I PSCH correlation block 1304 and Q PSCH correlation block 1306 operates upon a respective I and Q component of the diversity WCDMA signal received via the first receive path. The correlation block 1302A produces correlation outputs to energy combiner block 1312 that produces a correlation energy for the first receive path.

Likewise, correlation block 1302B includes I PSCH correlation block 1308 and Q PSCH correlation block 1310 that operates upon diversity WCDMA signal received via second receive path (from antenna 2). The correlation block 1302B produces a correlation result to energy combiner block 1314. The outputs of energy combiner blocks 1312 and 1314 are received by energy combiner block 1316 that determines a combined energy of the diversity WCDMA signals received via the two receive paths of. The output of energy combiner block 1316 is operated is received by accumulation block 1322. Accumulation block 1322 receives time drift control input and produces PSYNC correlation energy for each of a plurality of sampling positions.

The operation of the components 1300 of the PSYNC module that supports diversity operations are similar to those previously described for the PSYNC module that supports non-diversity operations. The reader will appreciate that a primary difference between the PSYNC module 1200 that supports diversity operations as compared to the PSYNC module 708 that supports non-diversity operations relates to the fact that PSYNC module 1200 operates upon the diversity WCDMA signals received via two receive paths and combines the energy of both receive paths to produce better correlation results.

Figure 14:
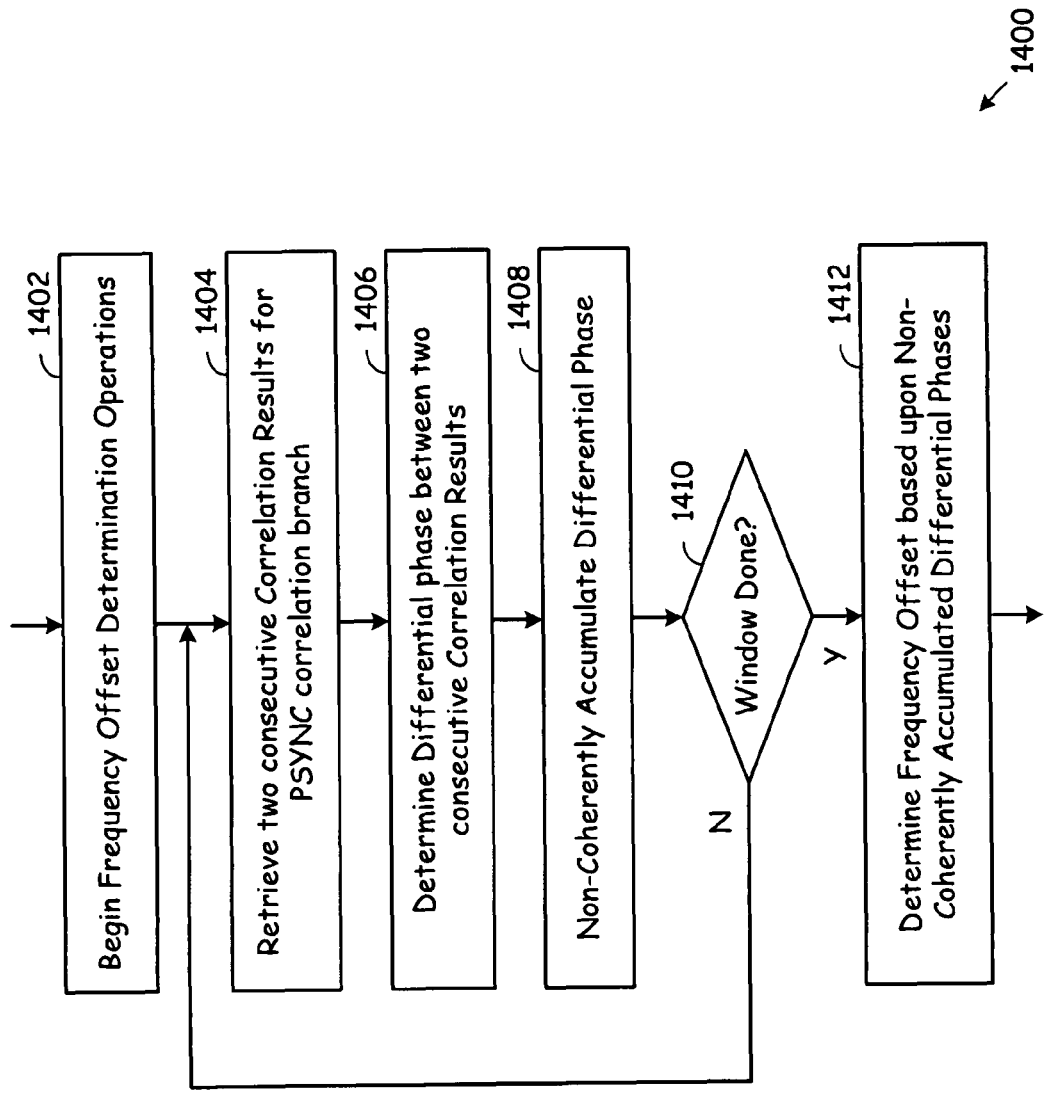
FIG. 14 is a flow chart illustrating operation for determining a frequency offset between a wireless terminal clock and a base station clock according to a first embodiment of the present invention.

FIG. 14 is a flow chart illustrating operation for determining a frequency offset between a wireless terminal clock and a base station clock according to a first embodiment of the present invention. The operations 1400 of FIG. 14 are performed by a PSYNC module of the present invention and may particularly be performed by the PSYNC module processing and control circuitry 802 illustrated in FIG. 8. Operations 1400 commence with the PSYNC module beginning its frequency offset determination operations (Step 1402). Operation continues with the PSYNC module retrieving two consecutive correlation results for a single PSYNC correlation branch. The two consecutive correlation results for the PSYNC correlation branch of Step 1404 may be for consecutive sampling positions. Alternatively, the two consecutive PSYNC correlation results may be for other than consecutive sampling positions.

Operation 1400 continues with the PSYNC module determining the differential phase between the two consecutive PSYNC correlation results selected at Step 1404 (Step 1406). The PSYNC module then non-coherently accumulates the differential phase determined at Step 1406 (Step 1408). The PSYNC module then determines whether the window of the operations of 1400 has completed (Step 1410). If the window is not complete as determined at Step 1410, operation returns to Step 1404. However, if the window is complete, as determined at Step 1410, operation continues with determining the frequency offset based upon the non-coherently accumulated differential phases (Step 1412). The non-coherently accumulated differential phases are a resultant of multiple operations of Step 1408. From Step 1412 operation ceases.

Figure 15:
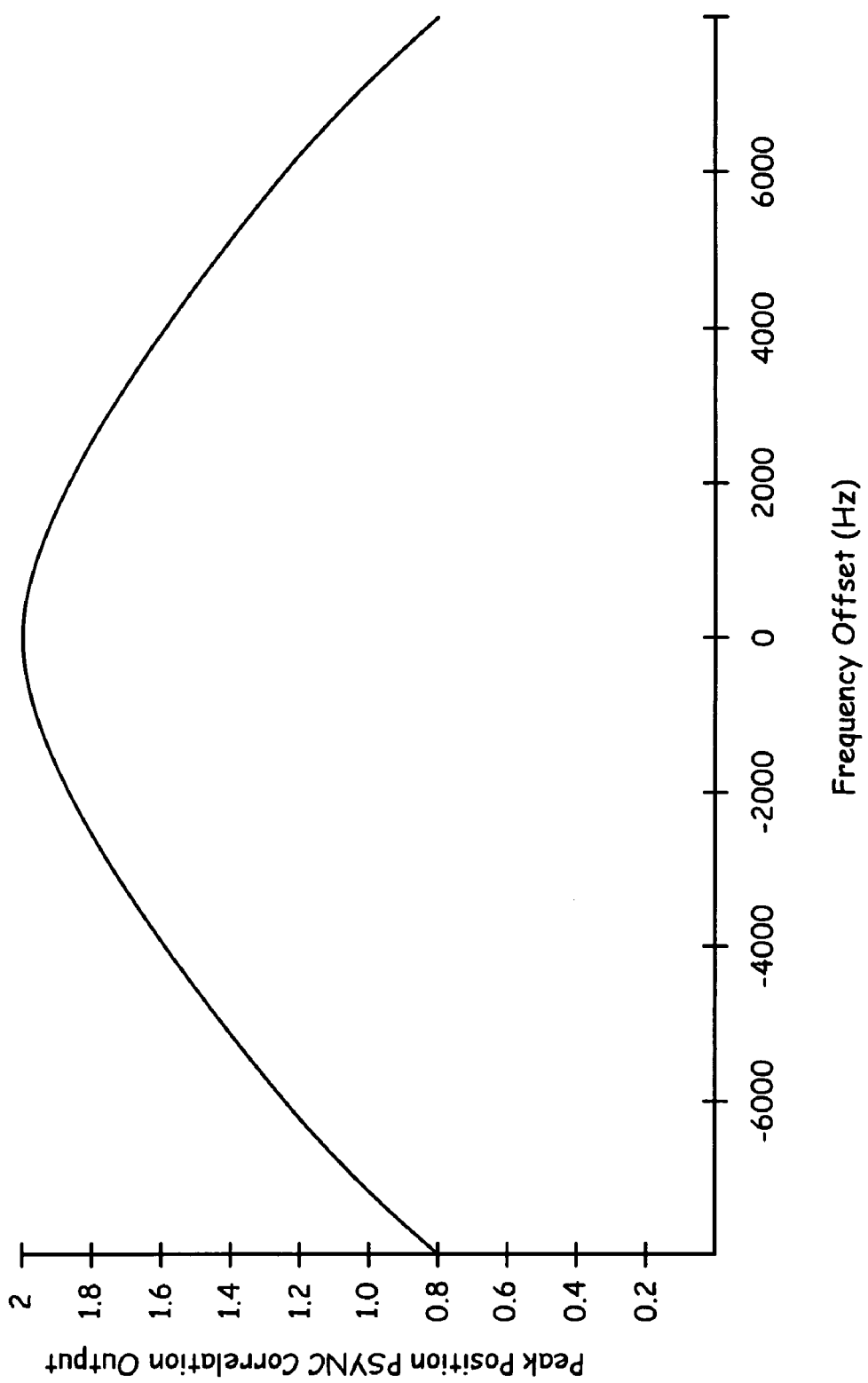
FIG. 15 is a graph illustrating expected peak position PSYNC correlation energy output versus frequency offset between the base station clock and a wireless terminal clock.

FIG. 15 is a graph illustrating expected peak position PSYNC correlation energy output versus frequency offset between the base station clock and a wireless terminal clock. As is shown, when the frequency offset is 0 Hz a peak position PSYNC correlation output would have a normalized value of 2 for a corresponding maximum sampling position. As the frequency offset falls off from the 0 Hz position to negative or positive frequency offsets the peak position PSYNC correlation output for a particular sampling position decreases. The pattern of FIG. 15 may be determined via simulation results for a particular PSYNC module. Relating the frequency offset illustrated in FIG. 15 to the perspective frequency offsets illustrated in FIGS. 10A and 10B, the performance of the PSYNC correlation branches is characterized.

After PSYNC correlation operations by the plurality of PSYNC correlation branches of the PSYNC module are performed for a particular WCDMA signal or a diversity WCDMA signal, the maximum accumulated PSYNC correlation energies of each branch/position may be compared to the predicted peak correlation outputs values of FIG. 15. Differing techniques may be employed in determining a particular frequency offset based upon accumulative PSYNC correlation energies produced by the PSYNC correlation branches. A first technique of pattern matching will be described with reference to FIG. 16. A second technique using table lookup will also be described with reference to FIG. 16. Both the pattern matching and table lookup techniques are based upon the expected peak position correlation outputs of the graph of FIG. 15.

Figure 16:
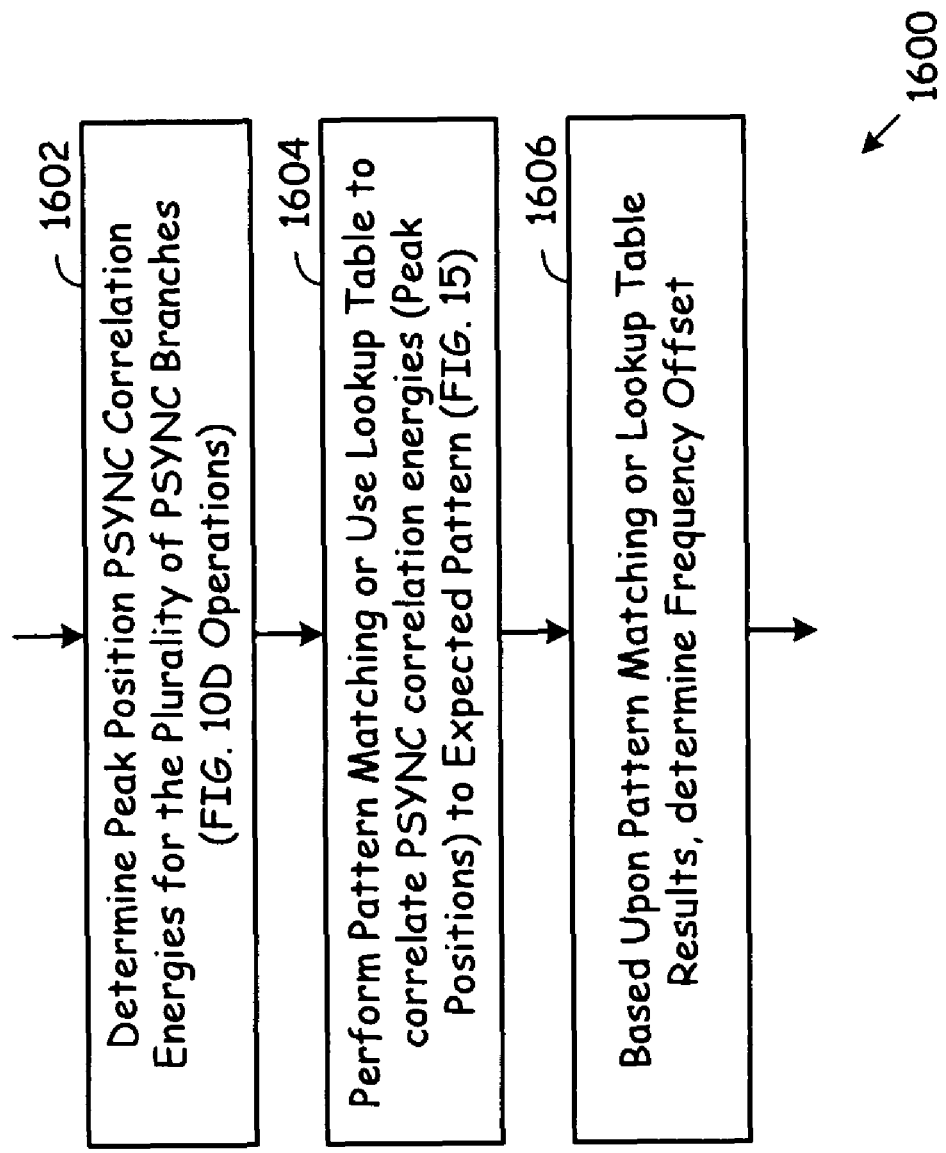
FIG. 16 is a flow chart illustrating a technique for estimating frequency offset between a base station clock and a wireless terminal clock by a PSYNC module according to embodiments of the present invention.

FIG. 16 is a flow chart illustrating a technique for estimating frequency offset between a base station clock and a wireless terminal clock by a PSYNC module according to embodiments of the present invention. The operation 1600 of FIG. 16 commence with determining peak position PSYNC correlation energies for each of the plurality of PSYNC branches/positions (Step 1602). One technique for accomplishing the operations of Step 1602 may be accomplished according to the operations 1050 previously described with reference to FIG. 10B.

Operation 1600 continues with performing either pattern matching or using a lookup table to correlate the PSYNC correlation energies (peak positions to the expected pattern illustrated in FIG. 15) (Step 1604). The operation 1600 continues with, based upon the pattern matching or lookup table results, determining the frequency offset (Step 1606). Given the expected peak position PSYNC correlation outputs of FIG. 15 for the plurality of PSYNC correlation branches, the actual peak position PSYNC correlation energies produced by the plurality PSYNC correlation branches can be best aligned with the expected results of FIG. 15 to determine the actual frequency offset between the base station clock and the wireless terminal clock. From Step 1606, operation ends.

Figure 17:
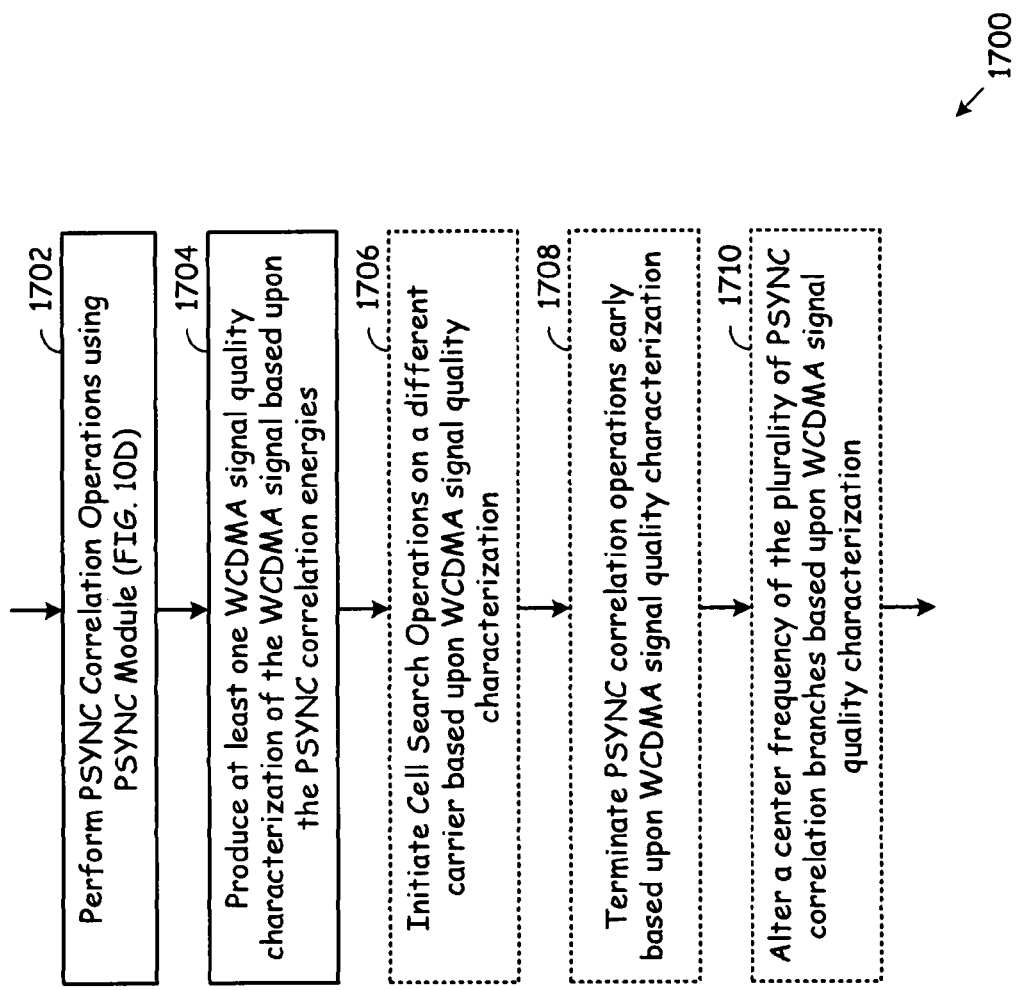
FIG. 17 is a flow chart illustrating operations of a PSYNC module for producing at least one WCDMA signal quality characterization of a WCDMA signal based upon PSYNC correlation energies produced by a plurality of PSYNC correlation branches according to embodiments of the present invention.

FIG. 17 is a flow chart illustrating operations of a PSYNC module for producing at least one WCDMA signal quality characterization of a WCDMA signal based upon PSYNC correlation energies produced by a plurality of PSYNC correlation branches according to embodiments of the present invention. Operation 1700 commences with performing PSYNC correlation operations using a PSYNC module of the present invention (Step 1702). The operations of Step 1702 may be accomplished using the operations 1050 previously described with reference to FIG. 10D. Operation 1700 continues with producing at least one WCDMA signal quality characterization of the WCDMA signal based upon the PSYNC correlation energies determined at Step 1702 (Step 1704). The at least one WCDMA signal quality characterization may be employed to perform additional operations according to the present invention. In a first example of such operations, the PSYNC module may initiate cell search operations on a different carrier based upon the WCDMA signal quality characterization (Step 1706). For example, when the WCDMA signal quality characterization produced at Step 1704 indicates a very low quality, it may be presumed that no WCDMA signal or a too weak WCDMA signal is present in the particular carrier under investigation by the PSYNC module. In such case, it may be concluded that no WCDMA signal of sufficient quality to establish communication with a base station on the particular carrier frequency is sufficient. In such case, Step 1706 would include ceasing the cell search operations on the particular carrier frequency and initiating cell search operations of a different carrier frequency based upon the WCDMA signal quality characterization.

Another operation that may be performed with the operation 1700 of FIG. 17 is to terminate the PSYNC correlation operations early based upon a favorable WCDMA signal quality characterization (Step 1708). Because PSYNC correlation operations of a PSYNC module according to the present invention may be performed over multiple slots, the WCDMA signal quality characterization may indicate that a WCDMA signal of sufficient quality has been found on the particular carrier of investigation before correlation has occurred over a predetermined number of slots. A high signal-to-noise ratio or other WCDMA signal quality characterization may indicate not only that a high quality WCDMA signal is present but that Phase I cell search operations have been successfully accomplished by the PSYNC module. In such case, the operations of Step 1708 would indicate that early termination of the Phase I cell search operations are successful.

In still another operation that may be performed with the operations 1700 of FIG. 17, the PSYNC module may alter a center frequency of the plurality of PSYNC correlation branches based upon the WCDMA signal quality characterization (Step 1710). In one particular operation of Step 1710, the PSYNC module, based upon the WCDMA signal quality characterization, may determine that none of the plurality of PSYNC correlation branches has produced a satisfactory PSYNC correlation result. In such case, the PSYNC module may conclude that the center frequency of the plurality of PSYNC correlation branches is not appropriately aligned to the anticipated base station clock frequency. Thus, at Step 1710, the PSYNC module may determine that a realignment of the center frequency of the plurality of PSYNC correlation branches is appropriate and may perform such realignment. From Step 1710, operations 1700 end or may start again from step 1702, depending on the present needs of the wireless terminal.

Figure 18:
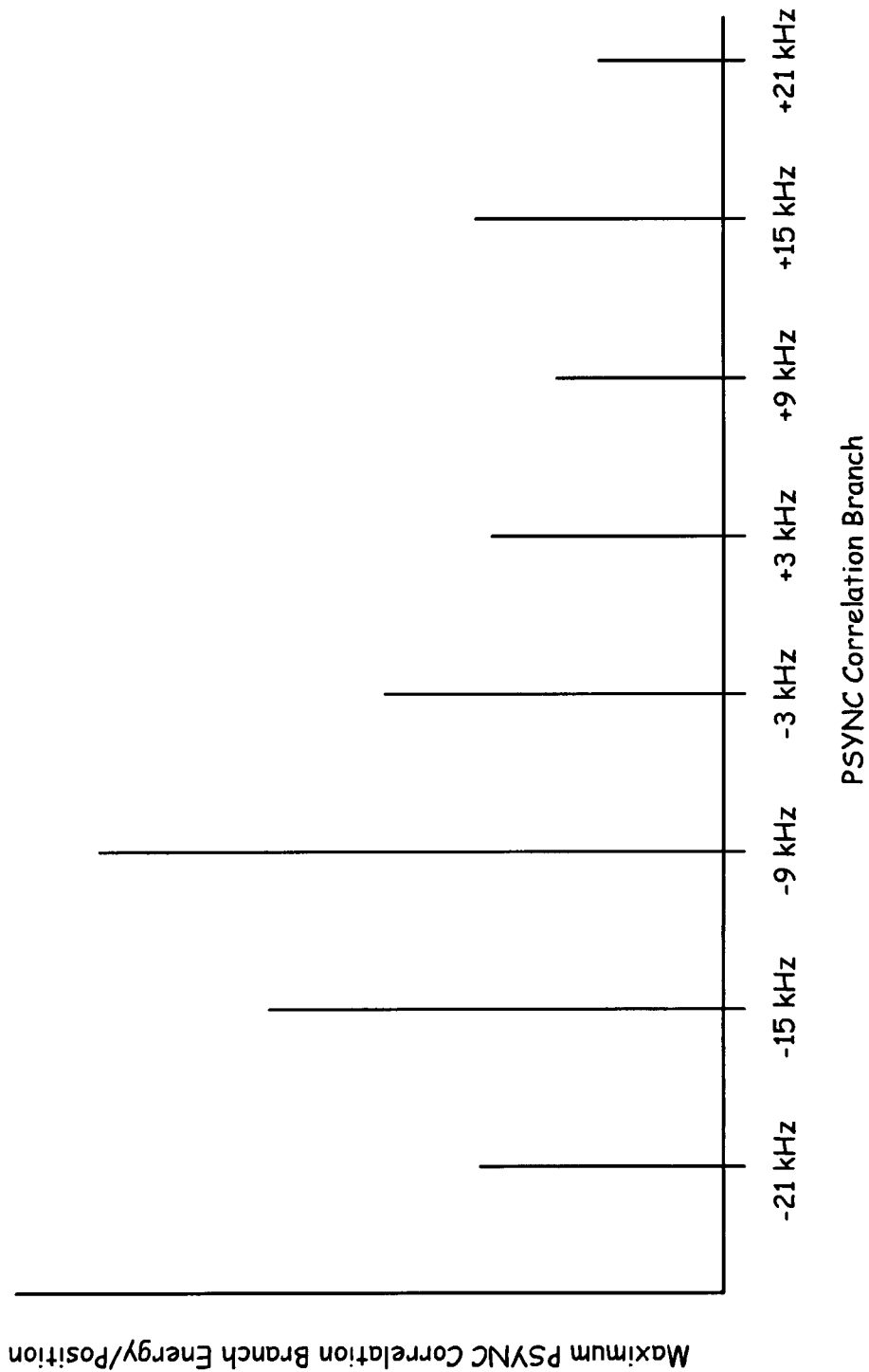
FIG. 18 is a graph illustrating an example of maximum PSYNC correlation branch energy/position values produced by a plurality of PSYNC correlation branches of a PSYNC module according to the present invention.

FIG. 18 is a graph illustrating an example of maximum PSYNC correlation branch energy/position values produced by a plurality of PSYNC correlation branches of a PSYNC module according to the present invention. The example of FIG. 18 illustrates for each of the plurality of branches, a maximum PSYNC correlation branch energy for a maximum energy sampling position. As shown, an overall maximum PSYNC correlation branch energy is produced for the PSYNC correlation branch at −9 kHz. Other of the PSYNC correlation branches at their maximum PSYNC correlation energy and sampling positions have a lower magnitude than does the PSYNC correlation branch corresponding to the −9 kHz position. The example of FIG. 18 will be used for reference in describing techniques for producing WCDMA signal quality characterizations in further description with reference to FIGS. 19-21.

Figure 19:
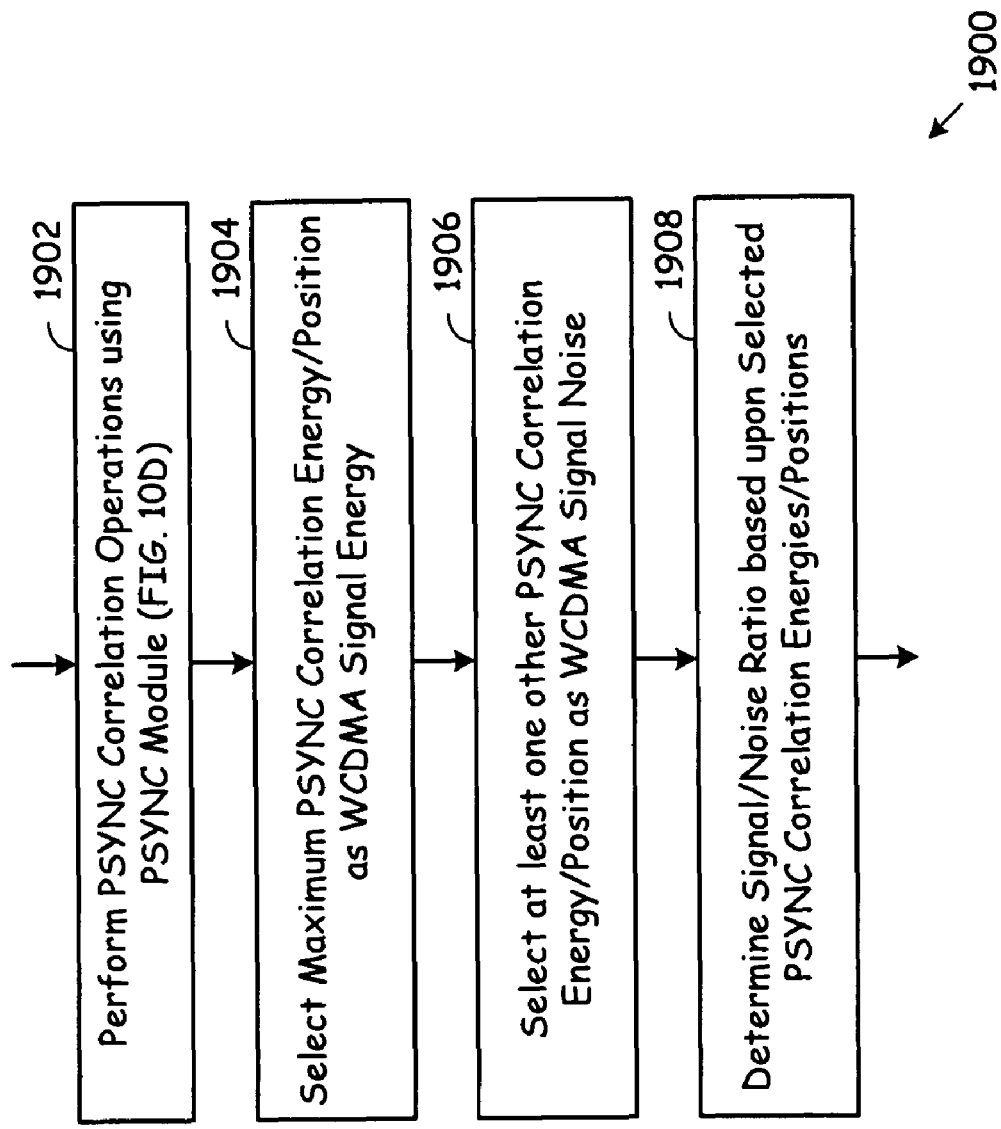
FIG. 19 is a flow chart illustrating operations for determining a WCDMA signal quality characterization according to an embodiment of the present invention.

FIG. 19 is a flow chart illustrating operations for determining a WCDMA signal quality characterization according to an embodiment of the present invention. Operations 1900 of FIG. 19 commence with performing PSYNC correlation operations using a PSYNC module of the present invention (Step 1902). These PSYNC correlation operations may be accomplished according to the operations 1050 previously described with reference to FIG. 10D. Operations 1900 continue with selecting a maximum PSYNC correlation energy/position as WCDMA signal energy (Step 1904). Referring to both FIGS. 19 and 18, the maximum PSYNC correlation energy/position selected as the WCDMA signal energy would be the value corresponding to the −9 kHz frequency offset PSYNC correlation branch.

Operation 1900 continues with selecting at least one other PSYNC correlation energy position as WCDMA signal noise (Step 1906). Referring still to both FIGS. 19 and 18, the WCDMA signal noise may be selected as one or more the maximum PSYNC correlation branch energy/positions of the PSYNC correlation branch other than the −9 kHz frequency offset PSYNC correlation branch. Then, a signal-to-noise ratio is determined based upon the select PSYNC correlation energies/positions determined at Steps 1904 and 1906 (Step 1908). In making the signal-to-noise ratio determination as the WCDMA signal quality characterization at Step 1908, the maximum PSYNC correlation branch energy/position corresponding to the −9 kHz frequency offset PSYNC correlation branch is used as the signal energy figure. Likewise, one or more of the other PSYNC correlation energies of the other PSYNC correlation branches are selected as the noise figures for the calculation at Step 1908. From Step 1908, operation ends.

Figure 20:
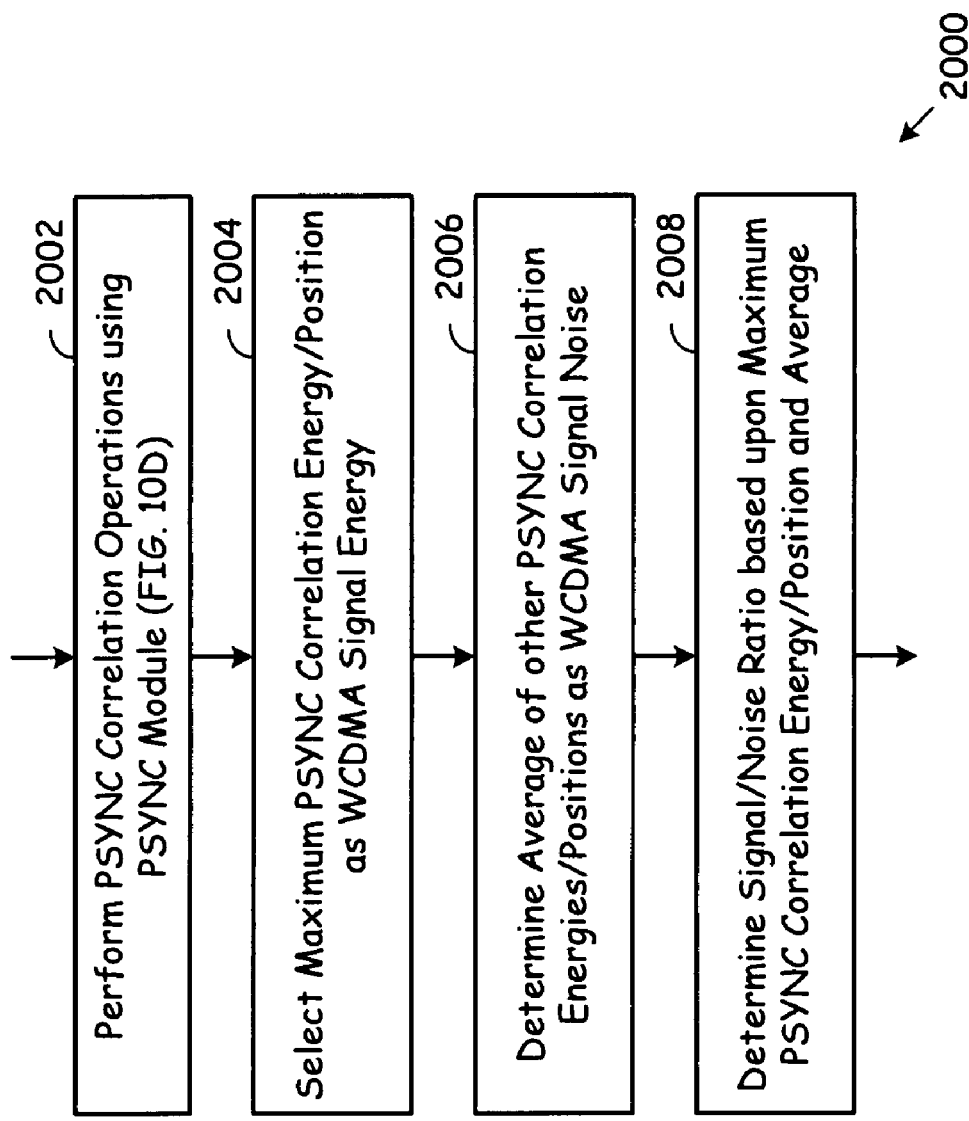
FIG. 20 is a flow chart illustrating another technique for determining a WCDMA signal quality characterization according to the present invention.

FIG. 20 is a flow chart illustrating another technique for determining a WCDMA signal quality characterization according to the present invention. Operation 2000 commences with performing PSYNC correlation operations using a PSYNC module of the present invention (Step 2002). The operations of Step 2002 may be performed according to the operations 1050 previously described with reference to FIG. 10D. Referring to both FIGS. 20 and 18, operation continues with selecting a maximum PSYNC correlation energy/position as WCDMA signal energy (Step 2004). In such case, the PSYNC correlation energy/position corresponding to the −9 kHz frequency offset of FIG. 18 would be selected as the WCDMA signal energy at Step 2004.

Operation continues with determining an average of the other PSYNC correlation energy/positions as the WCDMA signal noise (Step 2006). In such case, the maximum PSYNC correlation branch energy/position of the −21 kHz, −15 kHz, −3 kHz, +3 kHz, +9 kHz, +15 kHz, and +21 kHz frequency offset PSYNC correlation branches of FIG. 18 are selected at Step 2006 to determine an average as the WCDMA signal noise. In an alternate operation of Step 2006, the average of all of the maximum PSYNC correlation energies/positions for all of PSYNC correlation branches may be selected as the WCDMA signal noise. Then, at Step 2008, the PSYNC module determines a signal-to-noise ratio based upon the maximum PSYNC correlation energy/position determined at Step 2004 and the average PSYNC correlation energies/positions determined at Step 2006 (Step 2008). From Step 2008, operation ends.

Figure 21:
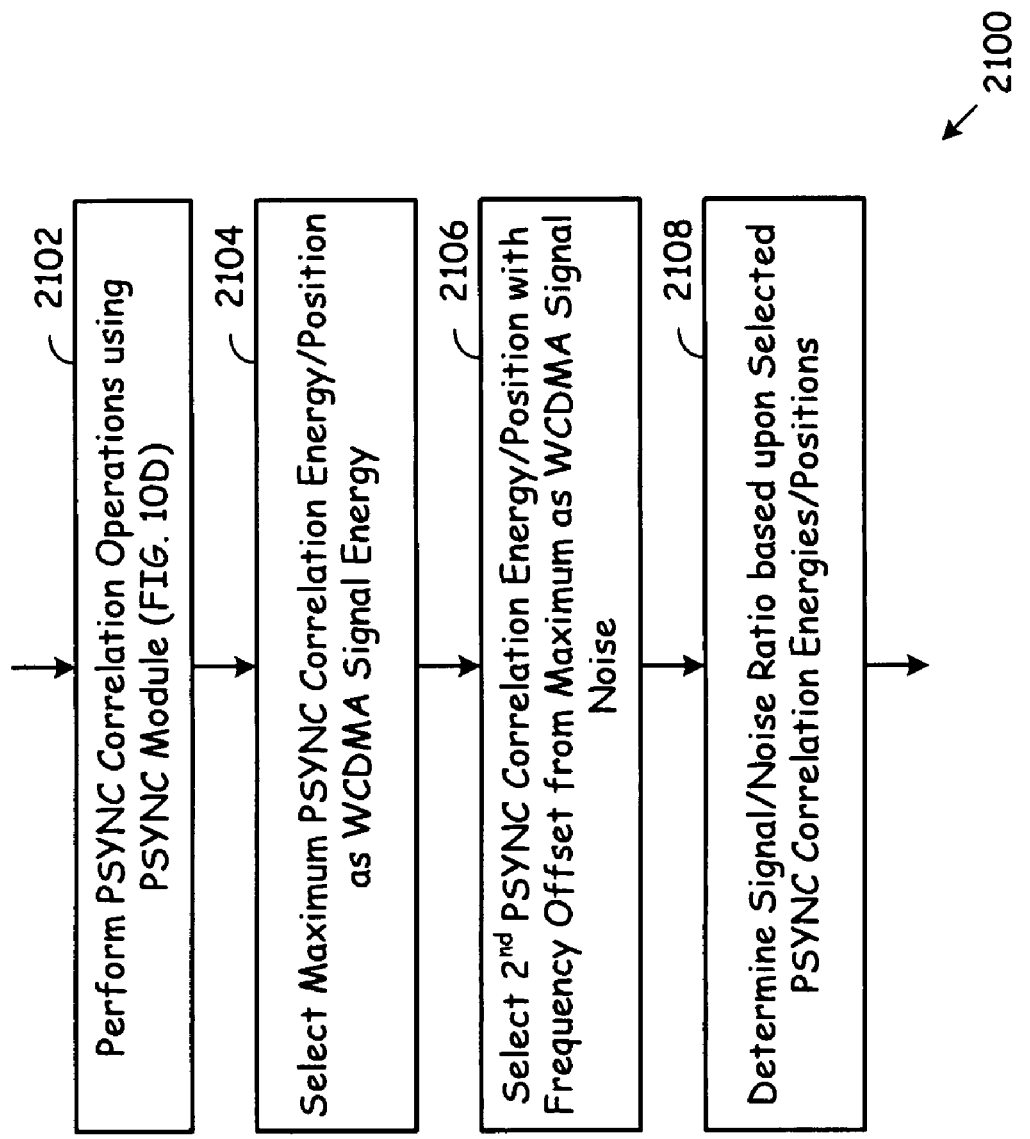
FIG. 21 is a flow chart illustrating still another technique for determining a WCDMA signal quality characterization according to the present invention.

FIG. 21 is a flow chart illustrating still another technique for determining a WCDMA signal quality characterization according to the present invention. Operation 2100 commences with performing PSYNC correlation operations using a PSYNC module according to the present invention (Step 2102). The operations of Step 2102 may be performed according to the operations 1050 previously described with reference to FIG. 10D. Operation 2100 continues with selecting a maximum PSYNC correlation energy/position as WCDMA signal energy (Step 2104). Referring to both FIGS. 21 and 18, the maximum PSYNC correlation branch energy/position corresponding to the −9 kHz frequency offset PSYNC correlation branch is selected at Step 2104.

Then, according to the operation 2100 of FIG. 21, a second PSYNC correlation energy/position with a frequency offset from the maximum PSYNC correlation energy determined at Step 2104 is selected as WCDMA signal noise (Step 2106). With the example of FIGS. 21 and 18, the WCDMA signal noise is selected 18 kHz away from the −9 kHz frequency offset PSYNC correlation branch of FIG. 18. In such case, the maximum PSYNC correlation branch energy/position is selected at +9 kHz frequency offset at FIG. 18. Such maximum PSYNC correlation branch energy/position is selected at the +9 kHz frequency offset PSYNC correlation branch as shown in FIG. 18.

Then, a signal-to-noise ratio based upon the selected PSYNC correlation energies/positions determined at Steps 2104 and 2106 is determined as the WCDMA signal quality characterization (Step 2108). Assuming that the maximum PSYNC correlation branch energy/position of the −9 kHz frequency offset PSYNC correlation branch corresponds to actual WCDMA signal energy, selecting the maximum PSYNC correlation branch energy/position at the +9 kHz frequency offset PSYNC correlation branch assumes that such PSYNC correlation branch energy/position at the +9 kHz frequency offset PSYNC correlation branch is noise. This assumption is based upon knowledge of frequent separation of actual WCDMA signal energy and noise as determined by the signal structure of the WCDMA signal. From Step 2108, operation ends.

Figure 22:
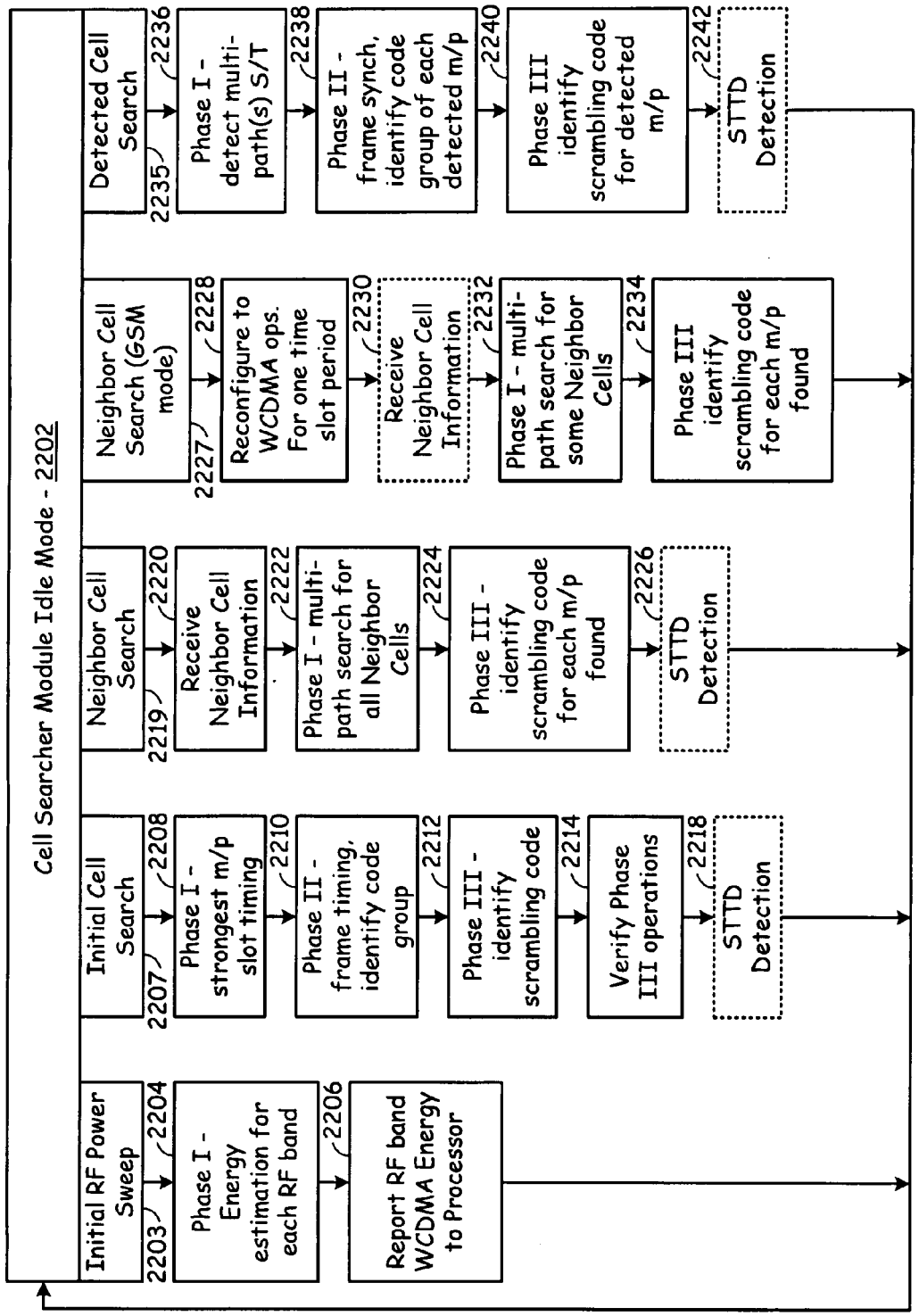
FIG. 22 is a flow chart illustrating operations of the cell searcher module of FIG. 7 and/or FIG. 8 according to embodiments of the present invention.

FIG. 22 is a flow chart illustrating operations of the cell searcher module 316(*s*) of FIG. 7 and/or FIG. 8 according to embodiments of the present invention. The cell searcher module 316 resides in an idle mode when not performing its particular operations (Step 2202). In a first set of operations, the cell searcher module 316 performs an initial RF power sweep (Step 2203). During the initial RF power sweep operations, the Phase I acquisition module (PSYNC module) of the cell searcher module 316 may perform energy estimation based on the Phase I correlation results within each RF band scanned (Step 2204). Alternatively, the cell searcher module 316, in conjunction with the RF front end of the radio 204 simply looks at the energy detected within each WCDMA RF band. When these operations are complete, the cell searcher module 316 reports WCDMA RF carrier energy to the coupled processor 302 (Step 906). Such reporting enables an upper layer protocol operation of the processor 302 to determine which RF carrier it should use to perform initial cell search operations.

Upon initiation of initial cell search operations (step 2207), the Phase I acquisition module (PSYNC module) 708 of the cell searcher module 316 of FIG. 7 is configured to perform initial cell search Phase I operations. Upon such configuration, the configurable Phase I acquisition module 708 or performs initial cell search/Phase I operations to acquire slot synchronization to the received WCDMA signal based upon correlation with the PSCH of the WCDMA signal (Step 2208).

Then, initial cell search Phase II operations are performed to acquire frame synchronization and code group identification of the WCDMA signal (Step 2210). The Phase II operations are performed by the configurable Phase II acquisition module 710 of the cell searcher module 316 of FIG. 7. After slot synchronization, frame synchronization, and code group identification has been performed, the cell searcher module 316 identifies the scrambling code of this WCDMA signal via correlation with the CPICH (Step 2212). In performing the Phase III operations, the configurable Phase III acquisition module 712 of FIG. 7 is configured to perform initial cell search Phase III operations. Then, the cell searcher module 316 verifies the Phase III operations (Step 2214) and may perform Space Time Transmit Diversity (STTD) detection (Step 2218). From Step 2218, operation proceeds to Step 2202 as it did from Step 2206.

In another operation, the cell searcher module 316 initiates neighbor cell search operations (Step 2219). Initiation of the neighbor cell search modules would typically be performed after initial cell search operations have been successfully performed. As is known, in WCDMA systems, a neighbor cell/sector may have differing slot and frame timings than a serving cell/sector. However, according to some embodiments of the present invention, it is presumed that the base station clocks of all base stations have a same frequency. Information regarding the code group and relative slot and frame timing of neighboring cells may be received by the RF transceiver (Step 2220). This information would be contained in control transmissions received from the serving cell. Based upon the received information, the processor 302 directs the cell searcher module 316 to search for multi-path components of all neighbor cells in Phase I (PSYNC) operations (Step 2222). These Phase I operations may be performed by the configurable Phase I acquisition module 708 of FIG. in a neighbor cell search Phase I configuration. In such case, the PSYNC module may be used with a single PSYNC correlation branch. Once the Phase I operations have been successfully completed, the cell searcher module 316 performs Phase III operations to identify the scrambling code for each multi-path component of the neighbor cell WCDMA signal found in the Phase I operations (Step 2224). Then, the cell searcher module 316 optionally performs STTD detection for the neighbor cell/sectors (Step 2226).

In an alternate operation according to the present invention, the RF transceiver may operate in a GSM mode in communicating with a serving cell. Operations in establishing communication with a serving cell/sector in GSM mode are not described herein except as they relate to the present invention. When the neighbor cell search (GSM mode) operations of Step 2227 are initiated, the RF terminal must reconfigure itself to perform the neighbor cell search while still supporting GSM operations. The cell searcher module 316 is reconfigured or configured for WCDMA operations for only one time slot, for example (Step 2228). Because this slot period of time is relatively short, operations are expedited and the number of correlations that may be performed in the neighbor cell search is limited. In some operations, neighbor cell search information will be received by the servicing GSM cell (Step 2230). Based on this information then, the cell searcher module 316 performs Phase I operations to search for multi-path components of neighboring cell/sectors (Step 2232). Then, the cell searcher module 316 performs Phase III operations to identify the scrambling code for each multi-path component of the neighboring cell/sectors that were found (Step 2234).

In another operation, the cell searcher module 316 performs detected cell search operations (Step 2235). These operations are similar to the initial cell search operations of Steps 2207-2218. In such case, the cell searcher module 316 performs Phase I operations to detect multi-path slot timing for detected cell/sector transmissions (Step 2236). The cell searcher module 316 then performs Phase II frame synchronization and code group identification operations for each of the detected multi-path signal components (Step 2238). Then, the cell searcher module 316 performs Phase III operations to identify the scrambling code for each detected multi-path signal component (Step 2240). Then, the cell searcher module 316 optionally performs STTD detection (Step 2242). Operation from Steps 2226, 2234 and 2242 return to Step 2202.

Figure 23:
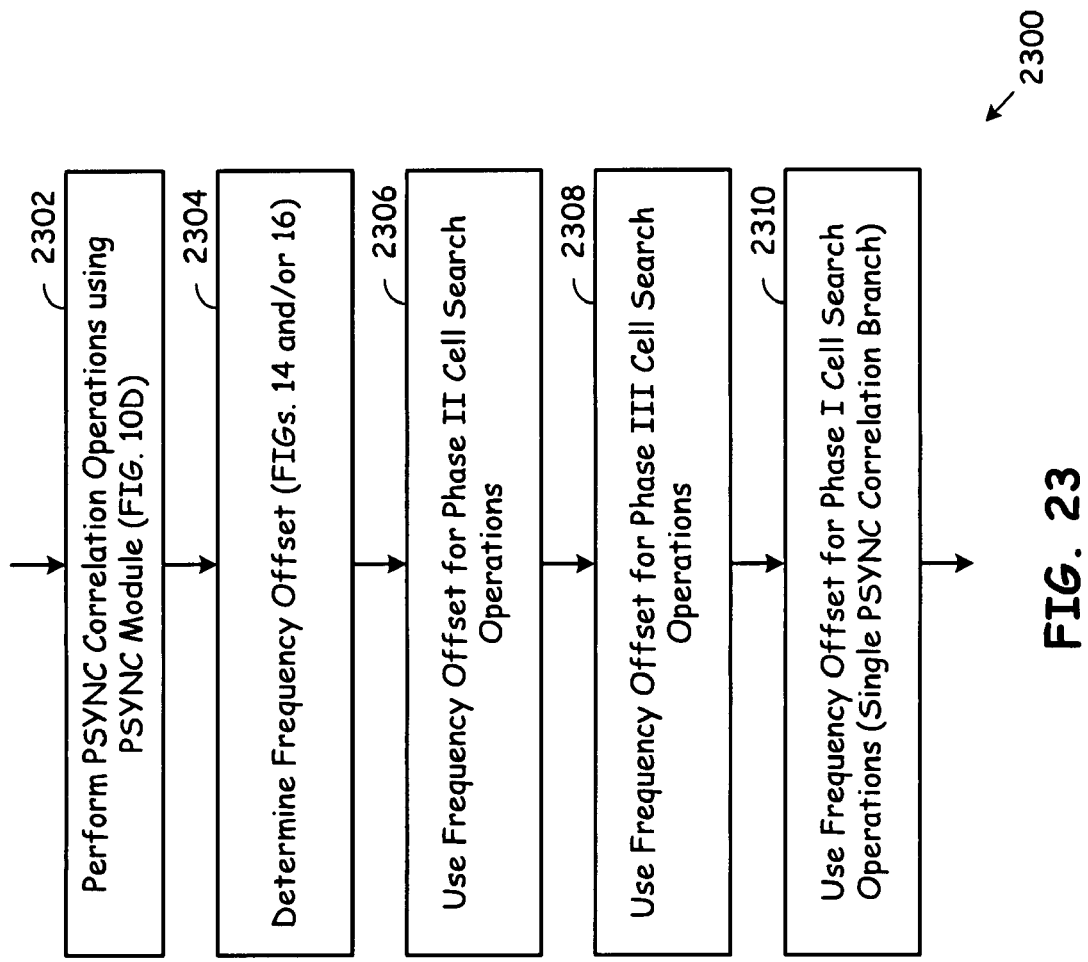
FIG. 23 is a flow chart illustrating cell search operations according to embodiments of the present invention.

FIG. 23 is a flow chart illustrating cell search operations according to embodiments of the present invention. Operations 2300 of FIG. 23 commence with performing PSYNC correlation operations using a PSYNC module of the present invention (Step 2302). The operations of Step 2302 may be accomplished according to the operations 1050 previously described with reference to FIG. 10D herein. Operations continue with determining a frequency offset between the base station clock and the wireless terminal clock (Step 2304). The operations previously described with reference to FIGS. 14 and/or 16 may be employed at Step 2304 to determine the frequency offset between the base station clock and the wireless terminal clock.

Once the frequency offset is determined at Step 2304, the frequency offset may be used for Phase II cell search operations (Step 2306) and for Phase III cell search operations (Step 2308). Phase II and Phase III cell search operations were previously described with reference to FIG. 22 and will not be described further herein with reference to FIG. 23. The frequency offset determined at Step 2304 may be further used for additional Phase I cell search operations (Step 2310). A presumption may be employed that the base station clocks of multiple base stations will have essentially no frequency offset there between. In such case, with the PSYNC module determining the frequency offset between the base station clock and the wireless terminal clock, such frequency offset may be used subsequently for all cell search operations, multipath detection operations, and other operations requiring synchronization between the wireless terminal and the base station. Periodically however, the wireless terminal may desire to perform additional frequency offset determination operations to ensure that the wireless terminal clock has not further drifted with respect to one or more base station clocks.

With the operation of Step 2310, with the frequency offset determined, the PSYNC module may disable all PSYNC correlation branches except for a single PSYNC correlation branch that uses the determined frequency offset. Such PSYNC correlation branch of the PSYNC module may be used to perform a neighbor cell search operations at Step 2310. From Step 2310, operation ends. The reader should appreciate that the multiple cell search modules of the cell search module 316 may perform their operations in parallel. For example, referring again to FIG. 7, the configurable Phase I, Phase II, and Phase III acquisition modules 708, 710, and 712 may perform their operations in parallel. Thus, still referring to FIG. 23, operations at Steps 2306, 2308, and 2310 may be performed in parallel by the wireless terminal.

Figure 24:
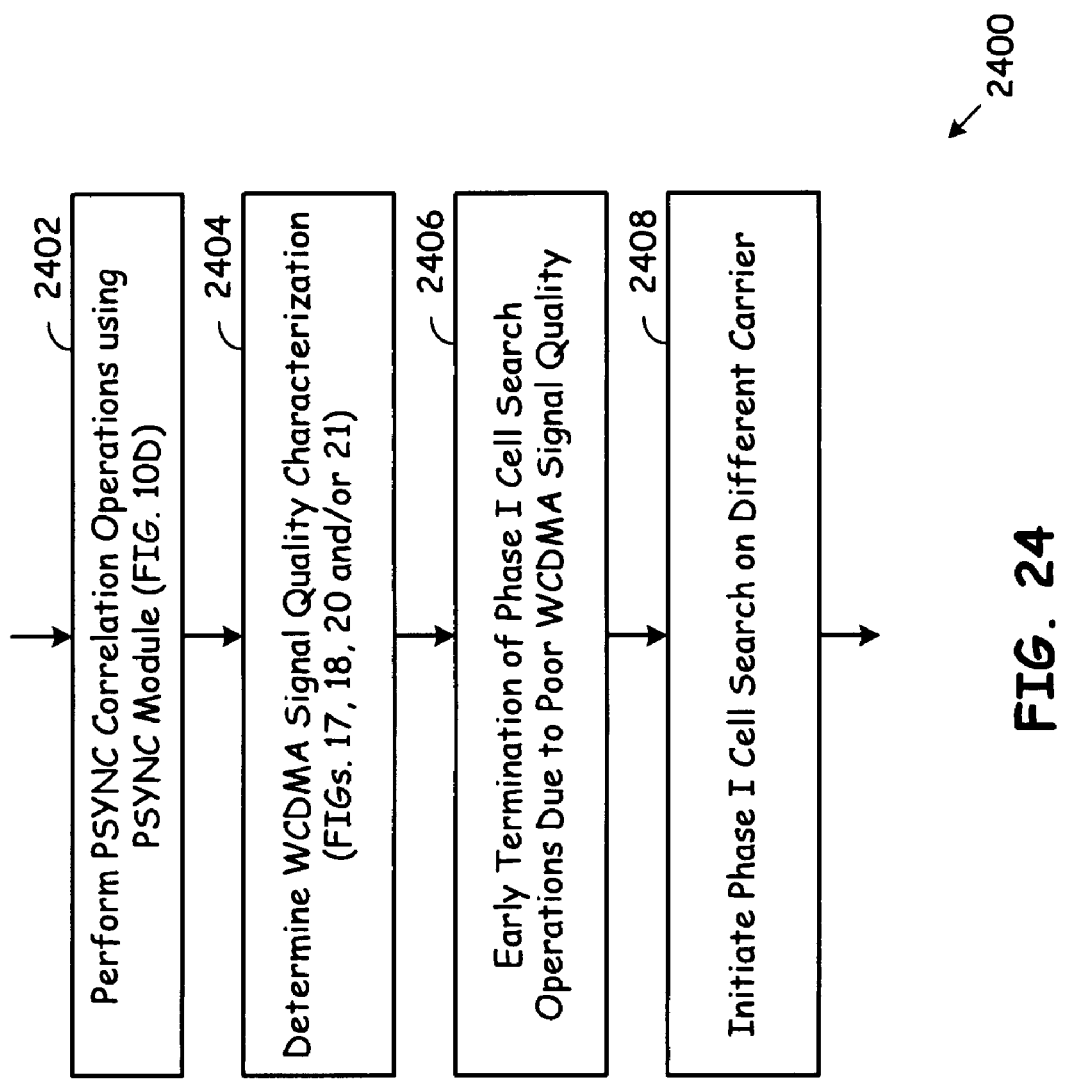
FIG. 24 is a flow chart illustrating further cell search operations according to embodiments of the present invention.

FIG. 24 is a flow chart illustrating further cell search operations according to embodiments of the present invention. Operation 2400 commences with the PSYNC correlation module performing PSYNC correlation operations (Step 2402). The operations at Step 2402 may be accomplished according to operations 1050 previously described with reference to FIG. 10D. Operation 2400 continues with the PSYNC module determining one or more WCDMA signal quality characterizations (Step 2404). One or more WCDMA signal quality characterizations may be determined according to the operations previously described with reference to FIGS. 17, 18, 20, and/or 21. Operation 2400 continues with the PSYNC module performing early termination of Phase I cell search operations due to poor WCDMA signal quality as determined based upon the WCDMA signal quality characterization of Step 2404 (Step 2406). Operation 2400 continues with the PSYNC module initiating Phase I cell search operation on a different carrier frequency (Step 2408). As was previously described, the PSYNC module may use the WCDMA signal quality characterization to determine that no WCDMA base station transmissions of sufficient quality exist in a currently monitored carrier frequency. In such case, with determination made, the PSYNC module initiates the Phase I cell search operations on a different carrier.

Figure 25:
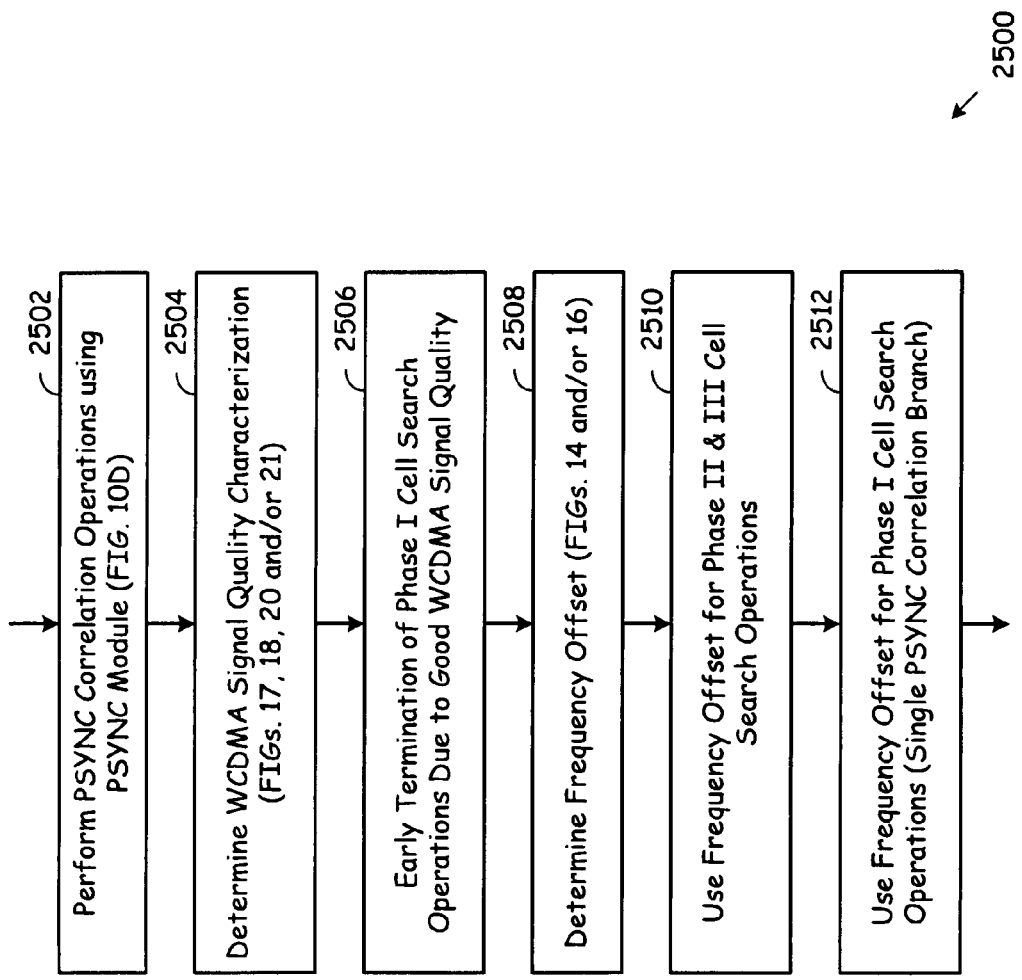
FIG. 25 is a flow chart illustrating still further cell search operations according to the present invention.

FIG. 25 is a flow chart illustrating still further cell search operations according to the present invention. The operations 2500 of FIG. 25 commence with the PSYNC module performing PSYNC correlation operations (Step 2502). The operations of Step 2502 may be accomplished according to the operations 1050 previously described with reference to FIG. 10D. Operations 2500 continue with the PSYNC module determining WCDMA signal quality characterizations (Step 2504). The WCDMA module may determine the WCDMA signal quality characterizations according to the operations previously described with reference to FIGS. 17, 18, 20, and/or 21.

Operations 2500 continue with the PSYNC module making an early termination of the Phase I cell search operations due to a good WCDMA signal quality characterization (Step 2506). The PSYNC module may make this early termination decision based upon correlations with a single slot of a received WCDMA signal. Such early termination decision would be made based upon a high WCDMA signal quality characterization.

Operations 2500 continue with the PSYNC module determining the frequency offset between the wireless terminal clock and the base station clock (Step 2508). The frequency determination operations previously described with reference to FIGS. 14 and/or 16 may be employed at Step 2508. Operations 2500 continue with the wireless terminal, in particular the cell search module 16 using the frequency offset for Phase I, Phase II, and Phase III cell search operations (Step 2510). The operations 2500 conclude with the PSYNC module using the frequency offset for subsequent Phase I cell search operations (Step 2512). In such case, with the frequency offset between the base station clock and the wireless terminal clock determined, the PSYNC module would use a single PSYNC correlation branch for the Phase I cell search operations of Step 2512. From Step 2512, operation ends.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A wireless terminal operable to receive a Wideband Code Division Multiple Access (WCDMA) signal from a base station, the wireless terminal comprising:
   clock circuitry operable to generate a wireless terminal clock using a wireless terminal oscillator;
   a wireless interface operable to receive the WCDMA signal, the WCDMA signal produced by the base station using a base station clock that is produced using a base station oscillator that is more accurate than the wireless terminal oscillator;
   a Primary Synchronization (PSYNC) module coupled to the wireless interface and to the clock circuitry, the PSYNC module comprising a plurality of PSYNC correlation branches, each PSYNC correlation branch operable to:
      phase rotate the WCDMA signal based upon a respective frequency offset;
      correlate the phase rotated WCDMA signal with a Primary Synchronization Channel (P-SCH) code over a plurality of sampling positions;
      produce PSYNC correlation energies based upon the correlations for each of the plurality of sampling positions; and
   the PSYNC module operable to produce at least one WCDMA signal quality characterization of the WCDMA signal based upon the PSYNC correlation energies of the plurality of PSYNC correlation branches.

2. The wireless terminal of claim 1, wherein the at least one WCDMA signal quality characterization is based upon a ratio of a maximum PSYNC correlation energy of a first PSYNC correlation branch to a noise value determined based upon maximum PSYNC correlation energies of at least one other PSYNC correlation branch.

3. The wireless terminal of claim 1, wherein in producing the at least one WCDMA signal quality characterization of the WCDMA signal based upon the PSYNC correlation energies of the plurality of PSYNC correlation branches, the PSYNC module is operable to:
   select maximum PSYNC correlation energies for each of the plurality of the PSYNC correlation branches;
   select a maximum PSYNC correlation energy from the maximum PSYNC correlation energies of the plurality of PSYNC correlation branches;
   determine an average PSYNC correlation energy based upon the maximum PSYNC correlation energies of the plurality of PSYNC correlation branches; and
   produce a WCDMA signal quality characterization as a ratio of the maximum PSYNC correlation energy to the average PSYNC correlation energy.

4. The wireless terminal of claim 1, wherein in producing the at least one WCDMA signal quality characterization of the WCDMA signal based upon the PSYNC correlation energies of the plurality of PSYNC correlation branches, the PSYNC module is operable to:
   select a first maximum PSYNC correlation energy that corresponds to a first PSYNC correlation branch;
   select a second maximum PSYNC correlation energy that corresponds to a second PSYNC correlation branch;
   wherein a frequency differential between respective frequency offsets of the first and second PSYNC correlation branches presumes that the first maximum PSYNC correlation energy is signal energy and the second maximum PSYNC correlation energy is noise energy, and
   produce a WCDMA signal quality characterization as a ratio of the first maximum PSYNC correlation energy to the second maximum PSYNC correlation energy.

5. The wireless terminal of claim 4, wherein the frequency differential is an integer multiple of frequency separation of respective frequency offsets of adjacent PSYNC correlation branches.

6. The wireless terminal of claim 1, wherein, the PSYNC module is operable to initiate cell search operations on a different carrier frequency based upon the at least one WCDMA signal quality characterization.

7. The wireless terminal of claim 1, wherein the PSYNC module is operable to alter a center frequency of the plurality of PSYNC correlation branches based upon the at least one WCDMA signal quality characterization.

8. The wireless terminal of claim 1, wherein a frequency span of the frequency offsets of the plurality of PSYNC correlation branches are selected based upon an expected maximum frequency offset of the wireless terminal clock and the base station clock.

9. The wireless terminal of claim 1, wherein the PSYNC module is further operable to estimate a frequency offset between the wireless terminal clock and the base station clock.

10. The wireless terminal of claim 1, wherein each PSYNC correlation branch of the PSYNC correlation module produces 2560 PSYNC correlation energies with respective sampling positions per each 2560 chip slot.

11. The wireless terminal of claim 1, wherein each PSYNC correlation branch of the PSYNC correlation module produces 5120 PSYNC correlation energies with respective sampling positions per each 2560 chip slot.

12. A method for operating a wireless terminal to receive a Wideband Code Division Multiple Access (WCDMA) signal from a base station, the method comprising:
    generating a wireless terminal clock using a wireless terminal oscillator;
    receiving the WCDMA signal, the WCDMA signal produced by the base station using a base station clock that is produced using a base station oscillator that is more accurate than the wireless terminal oscillator; and
    for each of a plurality of Primary Synchronization (PSYNC) correlation branches:
    phase rotating the WCDMA signal based upon a respective frequency offset;
    correlating the phase rotated WCDMA signal with a Primary Synchronization Channel (P-SCH) code over a plurality of positions; and
    producing PSYNC correlation energies based upon the correlations for each of the plurality of positions; and
    producing at least one WCDMA signal quality characterization of the WCDMA signal based upon the PSYNC correlation energies of the plurality of PSYNC correlation branches.

13. The method of claim 12, wherein producing the at least one WCDMA signal quality characterization of the WCDMA signal based upon the PSYNC correlation energies of the plurality of PSYNC correlation branches comprises:
    determining a maximum PSYNC correlation energy of a first PSYNC correlation branch;
    determining a noise value based upon maximum PSYNC correlation energies of at least one other PSYNC correlation branch; and
    determining a ratio of the maximum PSYNC correlation energy of the first PSYNC correlation branch to the noise value determined based upon maximum PSYNC correlation energies of the at least one other PSYNC correlation branch.

14. The method of claim 12, wherein producing the at least one WCDMA signal quality characterization of the WCDMA signal based upon the PSYNC correlation energies of the plurality of PSYNC correlation branches comprises:
    selecting maximum PSYNC correlation energies for each of the plurality of the PSYNC correlation branches;
    selecting a maximum PSYNC correlation energy from the maximum PSYNC correlation energies of the plurality of PSYNC correlation branches;
    determining an average PSYNC correlation energy based upon the maximum PSYNC correlation energies of the plurality of PSYNC correlation branches; and
    producing the WCDMA signal quality characterization as a ratio of the maximum PSYNC correlation energy to the average PSYNC correlation energy.

15. The method of claim 12, wherein producing the at least one WCDMA signal quality characterization of the WCDMA signal based upon the PSYNC correlation energies of the plurality of PSYNC correlation branches comprises:
    selecting a first maximum PSYNC correlation energy that corresponds to a first PSYNC correlation branch;
    selecting a second maximum PSYNC correlation energy that corresponds to a second PSYNC correlation branch;
    wherein a frequency differential between respective frequency offsets of the first and second PSYNC correlation branches presumes that the first maximum PSYNC correlation energy is signal energy and the second maximum PSYNC correlation energy is noise energy, and
    producing a WCDMA signal quality characterization as a ratio of the first maximum PSYNC correlation energy to the second maximum PSYNC correlation energy.

16. The method of claim 15, wherein the frequency differential is an integer multiple of frequency separation of respective frequency offsets of adjacent PSYNC correlation branches.

17. The method of claim 12, further comprising initiating cell search operations on a different carrier frequency based upon the at least one WCDMA signal quality characterization.

18. The method of claim 12, further comprising altering a center frequency of the plurality of PSYNC correlation branches based upon the at least one WCDMA signal quality characterization.

19. The method of claim 12, wherein a frequency span of the frequency offsets of the plurality of PSYNC correlation branches are selected based upon an expected maximum frequency offset of the wireless terminal clock and the base station clock.

20. The method of claim 12, further comprising estimating a frequency offset between the wireless terminal clock and the base station clock.

21. The method of claim 12, further comprising each PSYNC correlation branch producing 2560 PSYNC correlation energies with respective sampling positions per each 2560 chip slot.

22. The method of claim 12, further comprising each PSYNC correlation branch of the PSYNC correlation module producing 5120 PSYNC correlation energies with respective sampling positions per each 2560 chip slot.

* * * * *